United States Patent
Ohishi et al.

(10) Patent No.: US 10,042,343 B2
(45) Date of Patent: Aug. 7, 2018

(54) CONTROL DEVICE AND SPEED REDUCER SYSTEM

(71) Applicants: NATIONAL UNIVERSITY CORPORATION NAGAOKA UNIVERSITY OF TECHNOLOGY, Nagaoka-shi, Niigata (JP); NABTESCO CORPORATION, Tokyo (JP)

(72) Inventors: Kiyoshi Ohishi, Niigata (JP); Yuki Yokokura, Niigata (JP); Yosei Hirano, Niigata (JP); Koji Nakamura, Mie (JP); Masataka Sato, Mie (JP)

(73) Assignees: NATIONAL UNIVERSITY CORPORATION NAGAOKA UNIVERSITY OF TECHNOLOGY, Niigata (JP); NABTESCO CORPORATION, Tokyo (JP)

( * ) Notice: Subject to any disclaimer, the term of this patent is extended or adjusted under 35 U.S.C. 154(b) by 290 days.

(21) Appl. No.: 14/842,407

(22) Filed: Sep. 1, 2015

(65) Prior Publication Data

US 2016/0070247 A1 Mar. 10, 2016

(30) Foreign Application Priority Data

Sep. 4, 2014 (JP) .................................. 2014-180453

(51) Int. Cl.
  *G05D 13/62* (2006.01)
  *G05B 19/04* (2006.01)

(52) U.S. Cl.
  CPC ............. *G05B 19/04* (2013.01); *G05D 13/62* (2013.01); *G05B 2219/25052* (2013.01); *G05B 2219/25355* (2013.01)

(58) Field of Classification Search
  CPC ................................ G05B 19/04; G05D 13/62
  See application file for complete search history.

(56) References Cited

U.S. PATENT DOCUMENTS

| 6,492,787 B1 * | 12/2002 | Hibino | ...................... F16H 1/32 310/83 |
| 2006/0022628 A1 * | 2/2006 | Okumatsu | ................. H02P 6/16 318/437 |

(Continued)

FOREIGN PATENT DOCUMENTS

| JP | 2003-223225 A | 8/2003 |
| JP | 2012-122509 A | 6/2012 |

*Primary Examiner* — Mohammad Ali
*Assistant Examiner* — Vincent Chang
(74) *Attorney, Agent, or Firm* — Pillsbury Winthrop Shaw Pittman, LLP

(57) ABSTRACT

This application discloses a control device for controlling a motor configured to drive an oscillatory cyclo-speed reducer including an oscillatory gear portion formed with at least one hole at an eccentric position. The control device includes an angle acquirer for acquiring input information about an input rotational angle indicating a rotational angle of the motor, an estimator for estimating an angular error between the input rotational angle and an output rotational angle indicating a rotational angle of the oscillatory cyclo-speed reducer based on a quantity of the hole(s) and a corrector for determining a compensation current value in correspondence to the angular error and setting a magnitude of a current to be supplied to the motor by correcting a command current value using the compensation current value.

12 Claims, 30 Drawing Sheets

(56) References Cited

U.S. PATENT DOCUMENTS

| | | | | |
|---|---|---|---|---|
| 2009/0015188 A1* | 1/2009 | Sasaki | ............... | G05B 19/416 318/632 |
| 2011/0054820 A1* | 3/2011 | Sasaki | ............... | G05B 19/404 702/94 |
| 2012/0244984 A1* | 9/2012 | Yamamoto | ............ | B25J 9/0087 475/162 |

* cited by examiner

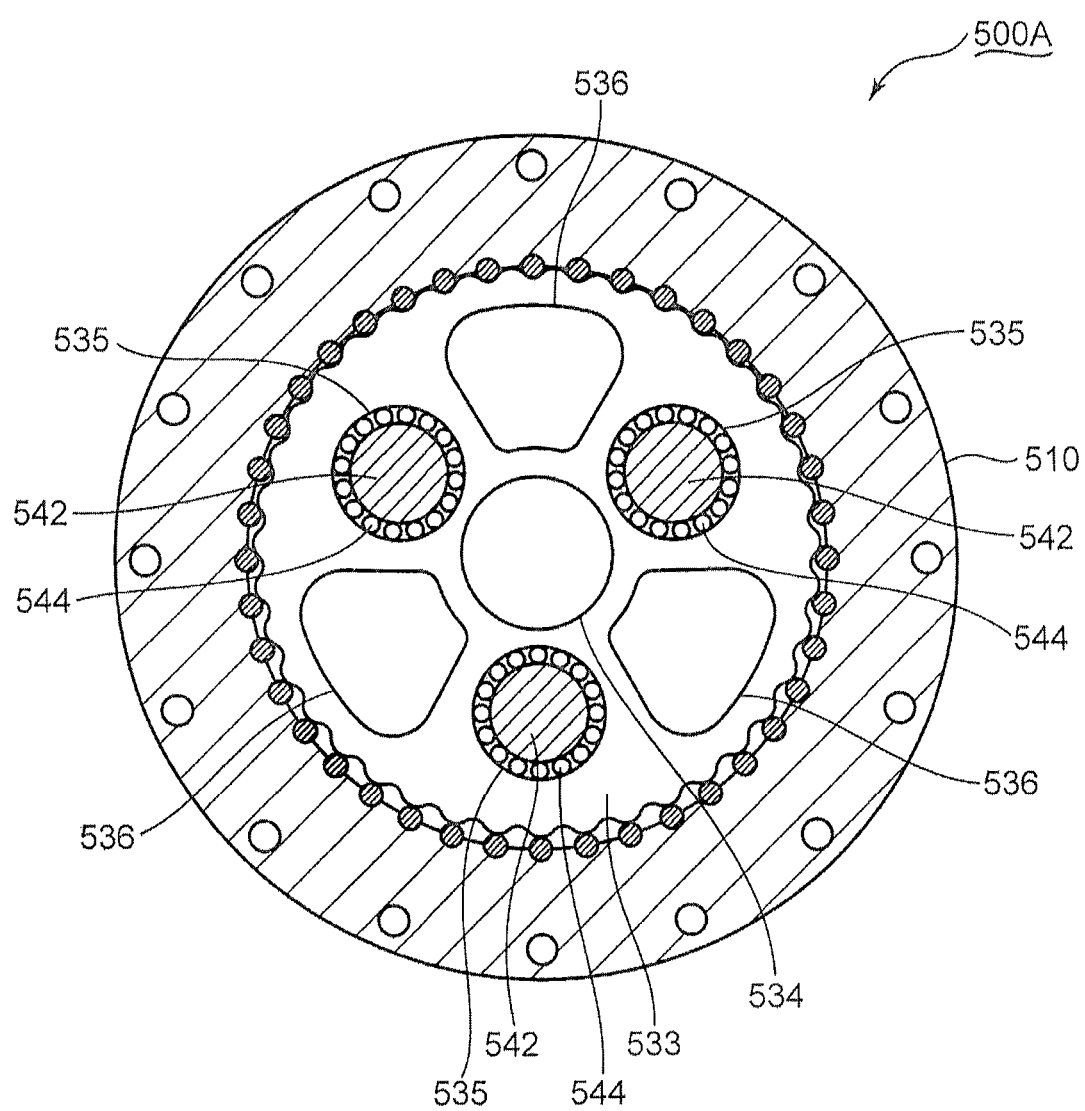

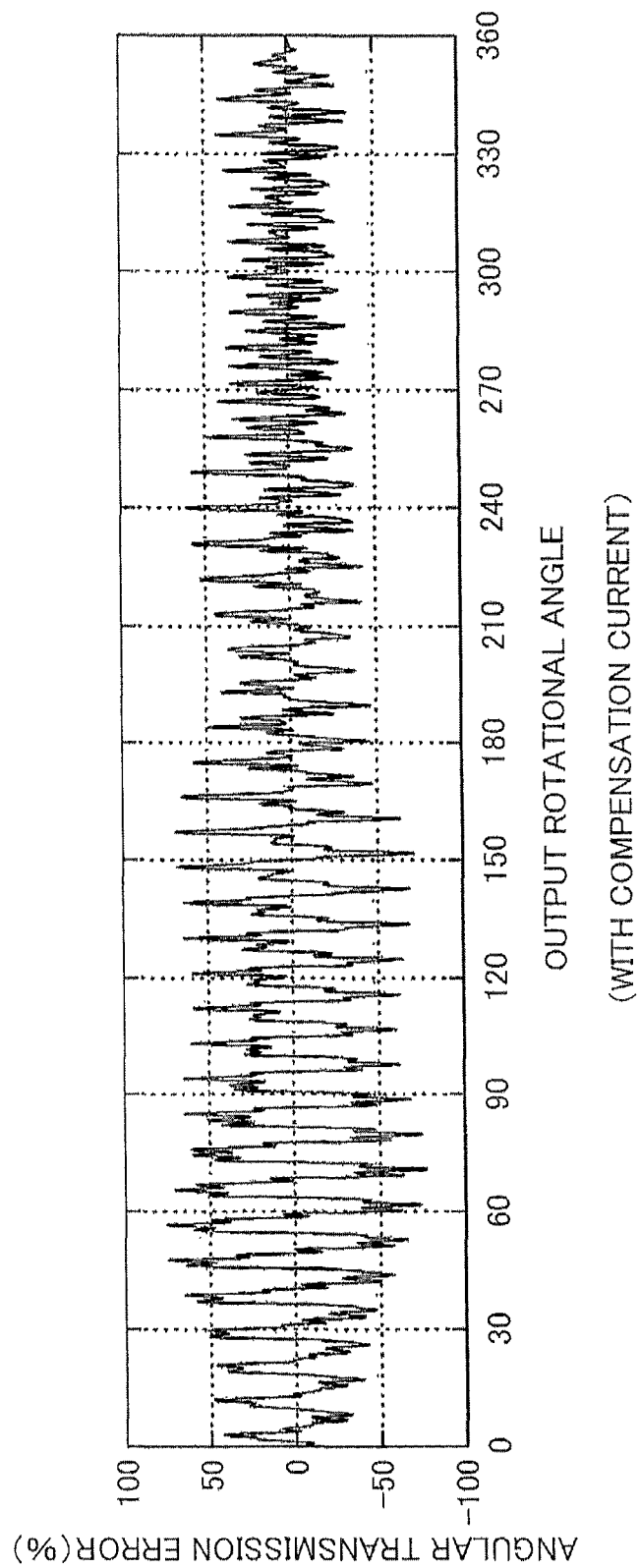

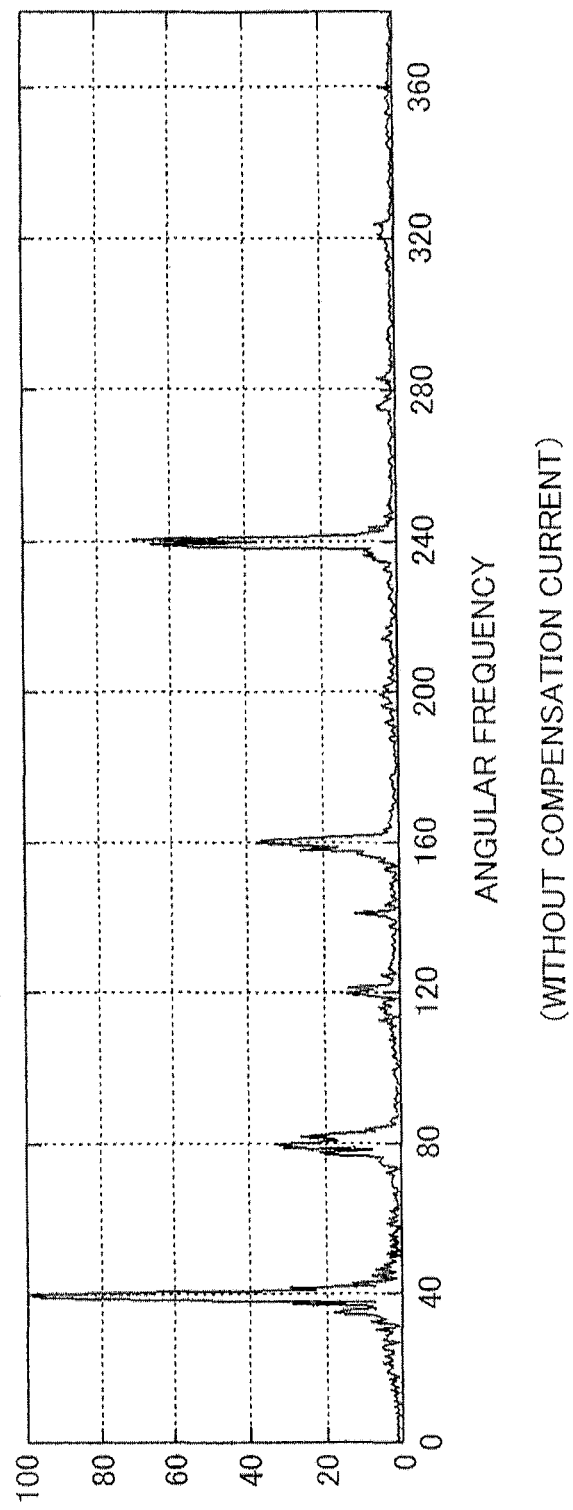

WITHOUT VIBRATION SUPPRESSION(SW1 : OFF, SW6 : OFF)

ONLY k = 1(SW1 : ON , SW6 : OFF)

ONLY k = 6(SW₁ : OFF, SW₆ : ON)

BOTH k =1, k = 6(SW1 : ON , SW6 : ON)

WITHOUT VIBRATION SUPPRESSION (SW1 : OFF , SW6 : OFF)

SUPPRESSION ONLY AT k = 1 (SW1 : ON , SW6 : OFF)

SUPPRESSION ONLY AT k = 6 (SW$_1$ : OFF , SW$_6$ : ON)

SUPPRESSION BOTH AT k =1 AND k = 6 (SW₁ : ON , SW₆ : ON)

US 10,042,343 B2

CONTROL DEVICE AND SPEED REDUCER SYSTEM

TECHNICAL FIELD

The present invention relates to control techniques for controlling an oscillatory cyclo-speed reducer.

BACKGROUND ART

A reduction in an angular transmission error of a speed reducer is required for a variety of technical fields such as industrial robots and machine tools. Various control techniques have been proposed (cf. JP 2012-122509 A and JP 2003-223225 A) in response to requests for a reduction in the angular transmission error.

JP 2012-122509 A proposes usage of an encoder arranged on an input side of a speed reducer and another encoder arranged on an output side of the speed reducer to reduce an angular transmission error. JP 2003-223225A proposes usage of error correction data acquired in advance to reduce an angular transmission error.

Techniques disclosed in JP 2012-122509 A require a plurality of encoders. Therefore, there is a high manufacturing cost of a control device incorporating the techniques disclosed in JP 2012-122509 A.

Techniques disclosed in JP 2012-122509 A require the arrangement of the encoder on the output side of the speed reducer. On the other hand, there are technical fields in which the arrangement of an encoder on an output side of a speed reducer is not desirable (e.g. technical fields of industrial robots). Therefore, the techniques disclosed in JP 2012-122509 A face a problem in versatility.

Techniques disclosed in JP 2003-223225 A require preparation of the error correction data inherent in every speed reducer in advance. Therefore, the techniques disclosed in JP 2003-223225 A require a lot of labor of a user in the preparation and management of the error correction data.

According to JP 2003-223225 A, the error correction data is prepared without considering a change in an angular transmission error caused by a load. Therefore, the techniques disclosed in JP 2003-223225 A may not sufficiently reduce the angular transmission error under a condition in which a load is applied to a speed reducer. As just described, the angular transmission error causes poor follow-up accuracy for a track defined by command values.

SUMMARY OF INVENTION

The present invention aims to provide control techniques for improving follow-up accuracy for a track defined by command values.

A control device according to one aspect of the present invention controls a motor configured to drive an oscillatory cyclo-speed reducer which includes an oscillatory gear portion provided with at least one hole at an eccentric position. The control device includes an angle acquirer configured to acquire input information about an input rotational angle, which indicates a rotational angle of the motor, an estimator configured to estimate an angular error between the input rotational angle and an output rotational angle, which indicates a rotational angle of the oscillatory cyclo-speed reducer on the basis of a hole number indicating a quantity of the at least one hole, and a corrector configured to determine a compensation current value in correspondence to the angular error. The corrector uses the compensation current value to correct a command current value and set a magnitude of a current, which is supplied to the motor.

A speed reducer system according to another aspect of the present invention includes an oscillatory cyclo-speed reducer including an oscillatory gear portion, which is provided with at least one hole at an eccentric position, a motor, which drives the oscillatory cyclo-speed reducer, and a control device, which controls the motor. The control device includes an angle acquirer configured to acquire input information about an input rotational angle, which indicates a rotational angle of the motor, an estimator configured to estimate an angular error between the input rotational angle and an output rotational angle, which indicates a rotational angle of the oscillatory cyclo-speed reducer on the basis of a hole number indicating a quantity of the at least one hole, and a corrector configured to determine a compensation current value in correspondence to the angular error. The corrector uses the compensation current value to correct a command current value and set a magnitude of a current, which is supplied to the motor.

The present invention may provide versatile control techniques for improving follow-up accuracy for a track defined by command values.

An object, features and advantages of the aforementioned control techniques will become more apparent by way of the following detailed description and accompanying drawings.

BRIEF DESCRIPTION OF DRAWINGS

FIG. 3 is a schematic view of the oscillatory cyclo-speed reducer shown in FIG. 2A, FIG. 7B shows experimental data acquired under a condition with a correction by the compensation current value, FIG. 16A shows a result of an FFT analysis obtained from the data shown in FIG. 15A.

DESCRIPTION OF EMBODIMENTS

Various embodiments about control techniques for a motor configured to drive an oscillatory cyclo-speed reducer are described below with reference to the accompanying drawings. The control techniques are clearly understandable by the following description.

First Embodiment

<Problem of Oscillatory Cyclo-Speed Reducer Found by Inventors et al>

Generally, a speed reducer has transmission characteristics such as elasticity, backlash and angular transmission error. These transmission characteristics worsen operational accuracy of a device incorporating the speed reducer. Wave gear devices and oscillatory cyclo-speed reducers are often used in technical fields such as industrial robots. The wave gear devices and the oscillatory cyclo-speed reducers may transmit power more accurately than general speed reducers.

An oscillatory cyclo-speed reducer may transmit power at a high speed reduction ratio and has very small backlash. The oscillatory cyclo-speed reducer is small in size and has high rigidity. In view of these characteristics, the oscillatory cyclo-speed reducer is often used for a part of large-size robots and industrial robots for which high rigidity is required.

An oscillatory cyclo-speed reducer includes annularly arranged internal teeth and an oscillatory gear portion meshed with the internal teeth. The oscillatory gear portion moves while being inscribed in a fixed circle defined by the internal teeth.

A designer designing an oscillatory cyclo-speed reducer may insert a shaft or another member into a hole formed in an oscillatory gear portion for designing and/or manufacturing reasons of the oscillatory cyclo-speed reducer. However, there may be a local reduction in rigidity of the oscillatory gear portion around a part formed with the hole.

The inventors et al, have figured out that the hole formed in the oscillatory gear portion gives a periodical variation to an angular error between rotational angles of a motor and the oscillatory cyclo-speed reducer and increases an angular transmission error. Control techniques for reducing an angular transmission error because of holes formed in an oscillatory gear portion is described in the first embodiment.

<Speed Reducer System>

Figure 1:
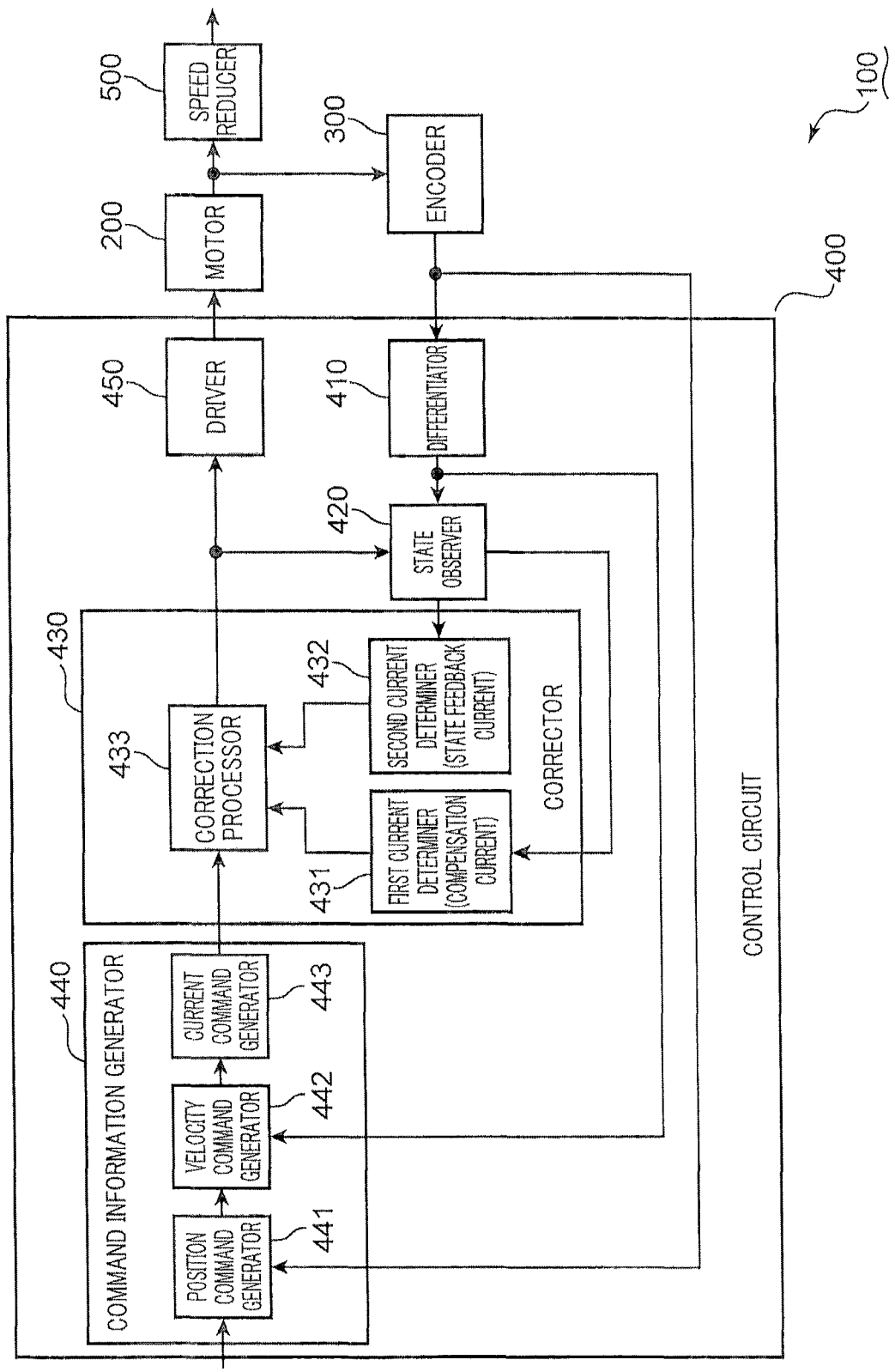
FIG. 1 is a schematic block diagram showing an exemplificative functional configuration of a speed reducer system.

FIG. 1 is a schematic block diagram showing an exemplificative functional configuration of a speed reducer system 100. The speed reducer system 100 is described with reference to FIG. 1, The speed reducer system 100 includes a motor 200, an encoder 300, a control circuit 400 and an oscillatory cyclo-speed reducer 500. The motor 200 drives the oscillatory cyclo-speed reducer 500 under control of the control circuit 400. In this embodiment, the control device is exemplified by the control circuit 400.

The encoder 300 may be mounted on the motor 200. The encoder 300 generates input information about an input rotational angle, which indicates a rotational angle of the motor 200. In this embodiment, the input information indicates a rotational angle of the motor 200. Alternatively, the input information may indicate other information about an angular velocity of the motor 200 and a rotational angle of the motor 200. Control principles of this embodiment are not limited to specific contents indicated by the input information.

In this embodiment, the encoder 300 is utilized as a device for generating the input information. Alternatively, another device configured to generate the input information may be used for the speed reducer system 100. The control principles of this embodiment are not limited to a specific technique for generating the input information.

The control circuit 400 includes a differentiator 410, a state observer 420, a corrector 430, a command information generator 440 and a driver 450. The aforementioned input information is output from the encoder 300 to the differentiator 410. The differentiator 410 differentiates the rotational angle, which is indicated by the input information, and calculates an angular velocity of the motor 200. Angular velocity information about an angular velocity of the motor 200 is output from the differentiator 410 to the state observer 420 and the command information generator 440. In this embodiment, the angle acquirer is exemplified by the differentiator 410. If the input information indicates an angular velocity of the motor 200, the angle acquirer may be an input port to which the input information is input. The control principles of this embodiment are not limited to a specific structure and a specific function of the angle acquirer.

The state observer 420 estimates an axial torsional vibration $\theta_s$ between an input rotational angle, which is indicated by the input information, and an output rotational angle, which indicates a rotational angle of the oscillatory cyclo-speed reducer 500, on the basis of how many holes are formed in the oscillatory gear portion of the oscillatory cyclo-speed reducer 500. The axial torsional vibration $\theta_s$ may be defined by the following equation. In this embodiment, the estimator is exemplified by the state observer 420. The angular error is exemplified by the axial torsional vibration $\theta_s$.

$$\dot{\theta}_s = \frac{\omega_M}{R_g} - \omega_L \qquad \text{[Equation 1]}$$

$\omega_M$: angular velocity of motor
$\omega_L$: angular velocity of oscillatory cyclo-speed reducer
$R_g$: speed reduction ratio of oscillatory cyclo-speed reducer The aforementioned definition equation about the axial torsional vibration $\theta_s$ includes a variable ($\omega_L$) of the angular velocity of the oscillatory cyclo-speed reducer 500. However, the control principles of this embodiment allow estimation of the axial torsional vibration $\theta_s$ without requiring direct measurement of an output operation of the oscillatory cyclo-speed reducer 500. Various computing techniques for estimating the axial torsional vibration $\theta_s$ are described later. Data indicating an estimated value of the axial torsional vibration $\theta_s$ is output from the state observer 420 to the corrector 430.

The corrector 430 includes a first current determiner 431, a second current determiner 432 and a correction processor 433. The data indicating the estimated value of the axial torsional vibration $\theta_s$ is output from the state observer 420 to the first and second current determiners 431, 432. The first current determiner 431 determines a compensation current value, which indicates a magnitude of a compensation current, with reference to the data indicating the estimated value of the axial torsional vibration $\theta_s$. The second current determiner 432 determines a state feedback current value, which indicates a magnitude of a state feedback current, with reference to the data indicating the estimated value of the axial torsional vibration $\theta_s$. The correction processor 433 uses the compensation current value and the state feedback current value to correct a command current value generated by the command information generator 440.

In this embodiment, the corrector 430 uses the state feedback current value in addition to the compensation current value to correct the command current value. Alternatively, the corrector 430 may use only the compensation current value to correct the command current value. The control principles of this embodiment are not limited to a specific computing technique for correcting the command current value.

The command information generator 440 includes a position command generator 441, a velocity command generator 442 and a current command generator 443. The position command generator 441 receives the aforementioned input information from the encoder 300. The position command generator 441 receives indication information, which indicates the rotational angle of the motor 200. The position command generator 441 compares the input information with the indication information to calculate a deviation of the present rotational angle of the motor 200 from the rotational angle designated by the indication information. Deviation information about the calculated deviation is output from the position command generator 441 to the velocity command generator 442.

The velocity command generator 442 receives angular velocity information from the differentiator 410, the angular velocity information indicating an angular velocity of the motor 200. The velocity command generator 442 uses the deviation information and the angular velocity information to generate velocity command information instructing a velocity. The velocity command information is output from the velocity command generator 442 to the current command generator 443.

The current command generator 443 determines a command current value on the basis of the velocity command information. Information indicating the command current value is output from the current command generator 443 to the correction processor 433. The correction processor 433 uses the compensation current value and the state feedback current value to correct the command current value as described above.

The command information generator 440 may use general feedback control techniques to determine the command current value. Therefore, the control principles of this embodiment are not limited to a specific method for determining the command current value.

The correction processor 433 uses the compensation current value and the state feedback current value to correct the command current value, and sets a magnitude of a supply current which is supplied to the motor 200. Supply current information indicating a magnitude of the supply current, which is supplied to the motor 200, is output from the correction processor 433 to the state observer 420 and the driver 450.

The driver 450 outputs a current to the motor 200 as a drive signal, a magnitude of the current being indicated by the supply current information. The motor 200 rotates in response to the drive signal.

In this embodiment, the driver 450 is formed as a driving circuit incorporated in the control circuit 400. Alternatively, the driver 450 may be separated from the control circuit 400. For example, the driver 450 may be a digital signal processor configured to execute a program for generating a drive signal from the aforementioned supply current information. The control principles of this embodiment are not limited to a specific structure and a specific function of the driver 450.

As described above, the state observer 420 receives the angular velocity information about an angular velocity of the motor 200 from the differentiator 410 and the supply current information indicating a magnitude of the supply current, which is supplied to the motor 200, from the correction processor 433. The state observer 420 utilizes the angular velocity information and the supply current information to estimate the aforementioned axial torsional vibration $\theta_s$.

<Oscillatory Cyclo-Speed Reducer>

The principles of the speed reducer system 100 described with reference to FIG. 1 may be utilized to drive a variety of oscillatory cyclo-speed reducers.

Figure 2A:
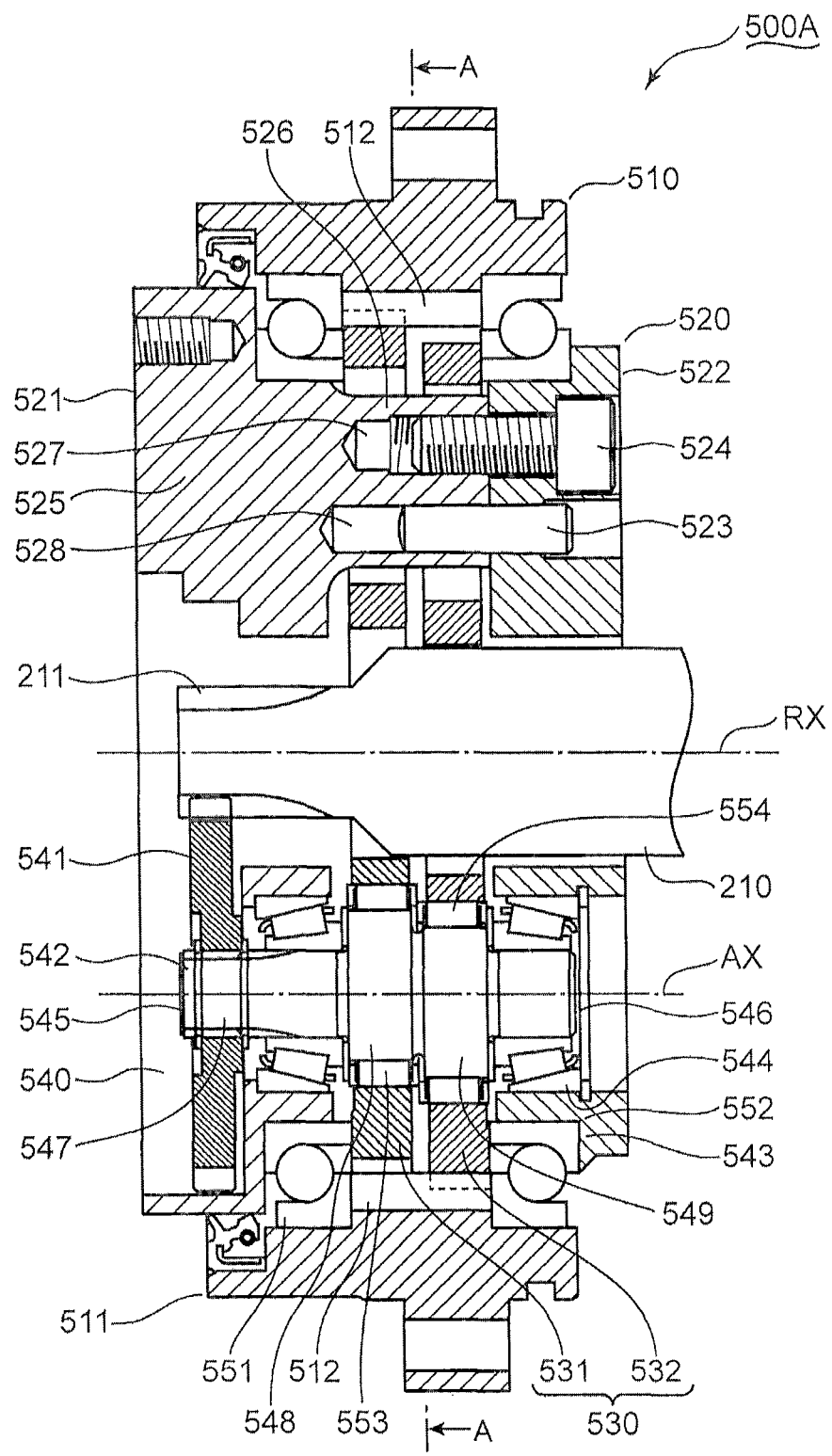
FIG. 2A is a schematic sectional view of an exemplificative oscillatory cyclo-speed reducer.
Figure 2B:
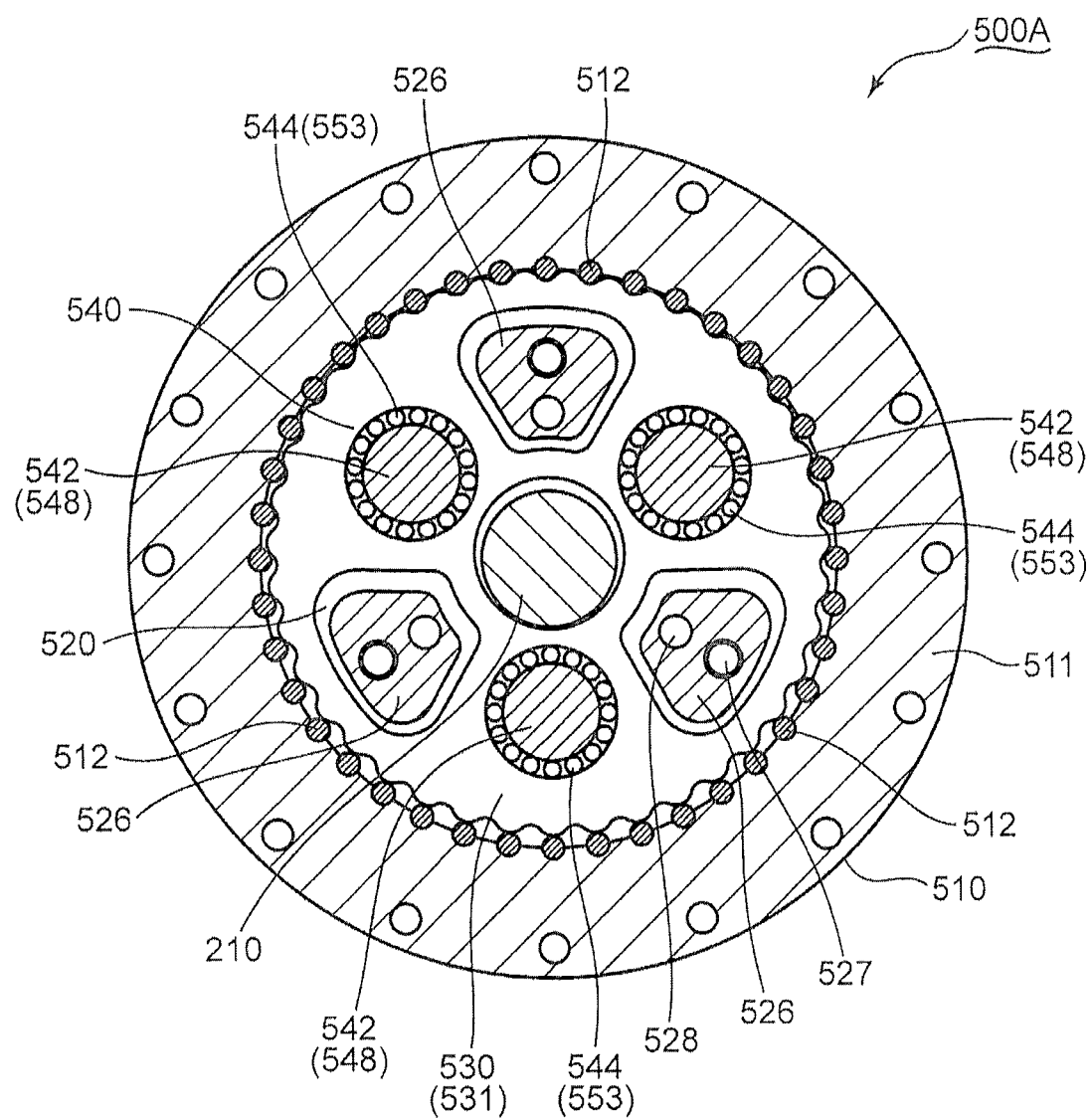
FIG. 2B is a schematic sectional view of the oscillatory cyclo-speed reducer along the line A-A shown in FIG. 2A.

FIGS. 2A and 2B show an exemplificative oscillatory cyclo-speed reducer 500A. FIG. 2A is a schematic sectional view of the oscillatory cyclo-speed reducer 500A. FIG. 2B is a schematic sectional view of the oscillatory cyclo-speed reducer 500A along the line A-A shown in FIG. 2A. The oscillatory cyclo-speed reducer 500A may be utilized as the oscillatory cyclo-speed reducer 500 described with reference to FIG. 1. The oscillatory cyclo-speed reducer 500A is described with reference to FIGS. 1 to 2B.

The oscillatory cyclo-speed reducer 500A includes an outer cylinder 510, a carrier 520, an oscillatory gear portion 530 and a driving mechanism 540. FIGS. 2A and 2B show an input shaft 210. The input shaft 210 may be a shaft of the motor 200 described with reference to FIG. 1. The encoder 300 described with reference to FIG. 1 may be mounted on the input shaft 210 and generate input information about an input rotational angle indicating a rotational angle of the input shaft 210.

The outer cylinder 510 includes an outer tube 511 and internal-tooth pins 512. The outer tube 511 defines a cylindrical inner space in which the carrier 520, the oscillatory gear portion 530 and the driving mechanism 540 are stored. The input shaft 210 extends along the center axis of the cylindrical inner space. Each of the internal-tooth pins 512 is a cylindrical member extending in an extending direction of the input shaft 210. Each of the internal-tooth pins 512 is fitted into a groove formed on the inner wall of the outer tube 511, Therefore, each of the internal-tooth pins 512 is appropriately held by the outer tube 511.

The internal-tooth pins 512 are arranged substantially at regular intervals around the input shaft 210. A semi-circumferential surface of each of the internal-tooth pins 512 projects toward the input shaft 210 from the inner wall of the outer tube 511. Therefore, the internal-tooth pins 512 function as internal teeth meshed with the oscillatory gear portion 530.

The carrier 520 includes a carrier base 521, an end plate portion 522, positioning pins 523 and fixing bolts 524. The carrier 520 has a cylindrical shape as a whole. The carrier 520 may rotate relatively to the outer cylinder 510. If the carrier 520 is fixed, the outer cylinder 510 rotates in response to rotation of the input shaft 210. If the outer cylinder 510 is fixed, the carrier 520 rotates in response to rotation of the input shaft 210. The input shaft 210 extends along the rotational axis RX of the carrier 520 or the outer cylinder 510.

The carrier base 521 includes a base plate portion 525 and three shaft portions 526. Each of the three shaft portions 526 extends from the base plate portion 525 toward the end plate portion 522. A screw hole 527 and a reamer hole 528 are formed on the tip surface of each of the three shaft portions 526. The positioning pin 523 is inserted into the reamer hole 528. Consequently, the end plate portion 522 is accurately positioned on the carrier base 521. The fixing bolt 524 is threadably engaged with the screw hole 527. Accordingly, the end plate portion 522 is appropriately fixed to the carrier base 521, The oscillatory gear portion 530 is arranged between the base plate portion 525 and the end plate portion 522. The three shaft portions 526 extend through the oscillatory gear portion 530 and are connected to the end plate portion 522.

The oscillatory gear portion 530 includes a first oscillation gear 531 and a second oscillation gear 532. The first oscillation gear 531 is arranged between the base plate portion 525 and the second oscillation gear 532. The second oscillation gear 532 is arranged between the end plate portion 522 and the first oscillation gear 531.

The first oscillation gear 531 is similar to the second oscillation gear 532 in shape and size. The first and second oscillation gears 531, 532 move in the outer tube 511 in a circulating manner while being meshed with the internal-tooth pins 512. Therefore, the centers of the first and second oscillation gears 531, 532 circulate around the rotational axis RX of the input shaft 210.

The first oscillation gear 531 is different in circulation phase substantially by 180° from the second oscillation gear 532. While the first oscillation gear 531 is meshed with a half of the internal-tooth pins 512 of the outer cylinder 510, the second oscillation gear 531 is meshed with the remaining half of the internal-tooth pins 512. Therefore, the oscillatory gear portion 530 may rotate the outer cylinder 510 or the carrier 520.

The driving mechanism 540 includes three transmission gears 541, three crankshafts 542, a main bearing portion 543 and three crankshaft bearing portions 544. A gear potion 211 meshed with the three transmission gears 541 is formed on the tip of the input shaft 210. Therefore, the three transmission gears 541 may receive a drive force from the input shaft 210.

Each of the three crankshafts 542 includes a first end 545 and a second end 546. The first end 545 is surrounded by the base plate portion 525 of the carrier 520. The second end 546 is surrounded by the end plate portion 522 of the carrier 522.

Each of the three crankshafts 542 includes a cylindrical shaft 547, a first crank 548 and a second crank 549. The shaft 547 extends straight along the axis AX from the first end 545 to the second end 546. The first and second cranks 548, 549 are disc-like members eccentric from the axis AX. The difference in circulation phase between the first and second oscillation gears 531, 532 is determined by the first and second cranks 548, 549.

The transmission gear 541 is mounted on the first end 545. When the input shaft 210 rotates, each of the three crankshafts 542 rotates. Accordingly, the first and second cranks 548, 549 eccentrically rotate about the axis AX.

The main bearing portion 543 is arranged between the outer cylinder 510 and the carrier 520. The main bearing portion 543 includes a first main bearing 551 and a second main bearing 552. The first main bearing 551 rotatably supports the carrier base 521 in the outer cylinder 510. The second main bearing 552 rotatably supports the end plate portion 522 in the outer cylinder 510. Therefore, the carrier 520 may rotate relatively to the outer cylinder 510.

Each of the three crankshaft bearing portions 544 includes a first crankshaft bearing 553 and a second crankshaft bearing 554. The first crankshaft bearing 553 is arranged between the first crank 548 and the first oscillation gear 531. The first crankshaft bearing 553 rotatably supports the first crank 548. When the crankshaft 542 rotates, the first crank 548 eccentrically rotates. Therefore, the first oscillation gear 531 may move in a circulating manner in the outer cylinder 510 while being meshed with the internal-tooth pins 512. The second crankshaft bearing 554 is arranged between the second crank 549 and the second oscillation gear 532. The second crankshaft bearing 554 rotatably supports the second crank 549. When the crankshaft 542 rotates, the second crank 549 eccentrically rotates. Therefore, the second oscillation gear 531 may move in a circulating manner in the outer cylinder 510 while being meshed with the internal-tooth pins 512.

A speed reduction ratio $R_g$ used in the aforementioned "Equation 1" is determined by how many teeth each of the gear portion 211 of the input shaft 210, the transmission gears 541 and the first and second oscillation gears 531 has and how many internal-tooth pins 512 are there.

<Cause of Angular Transmission Error>

FIG. 3 is a schematic view of the oscillatory cyclo-speed reducer 500A. Holes as a cause of an angular transmission error are described with reference to FIGS. 2A and 3.

FIG. 3 shows an oscillation gear 533 arranged in the outer cylinder 510. The oscillation gear 533 corresponds to each of the first and second oscillation gears 531, 532 described with reference to FIG. 2A. Therefore, the description about the oscillation gear 533 is applicable to both of the first and second oscillation gears 531, 532.

The oscillation gear 533 is provided with a center hole 534, three crank holes 535 and three shaft holes 536.

The input shaft 210 described with reference to FIG. 2A is inserted into the center hole 534. The center hole 534 is larger in diameter than the input shaft 210 described with reference to FIG. 2A. Therefore, the oscillation gear 533 may move in a circulating manner along an inner wall of the outer cylinder 510.

The crankshafts 542 and the crankshaft bearing portions 544 are arranged in the crank holes 535. Since the crank hole 535 is entirely filled by the crankshaft 542 and the crankshaft bearing portion 544, it is considered that an area of the crank hole 535 is substantially rigid. Therefore, it is considered that the crank hole 535 is less likely to contribute to the angular transmission error.

The shaft portions 526 described with reference to FIG. 2A are inserted into the shaft holes 536. The shaft hole 536 is larger than a cross-section of the shaft portion 526 so as to allow the aforementioned circulating motion of the oscillation gear 533.

Figure 4:
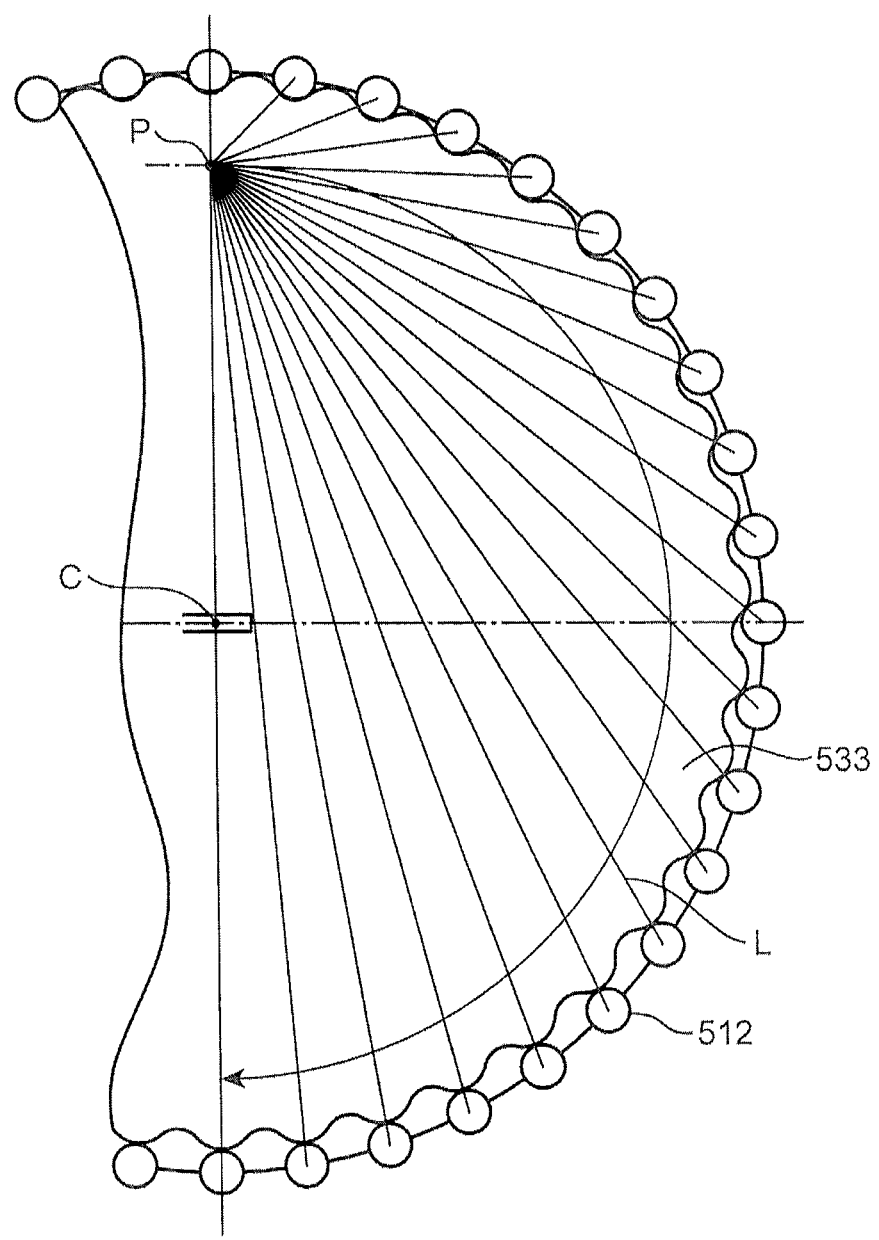
FIG. 4 is a schematic view showing forces acting on an oscillation gear of the oscillatory cyclo-speed reducer depicted in FIG. 3.

FIG. 4 is a schematic view showing forces acting on the oscillation gear 533, The holes causing the angular transmission error are described with reference to FIGS. 3 and 4.

FIG. 4 shows straight lines L extending from each of the internal-tooth pins 512. Each of the straight lines L extends toward a point P in the oscillation gear 533. Each of the straight line L of FIG. 4 represents a force received by the oscillation gear 533 from the internal-tooth pin 512. Therefore, FIG. 4 shows that the forces received from the internal-tooth pins 512 are concentrated on one point in the oscillation gear 533.

FIG. 4 further shows a center point C of the outer cylinder 510. The point P moves along a circular trajectory around the center point C when the oscillation gear 533 rotates in the outer cylinder 510, Since the center hole 534 is formed around the center point C as the center, a distance from the center hole 534 to the point P is substantially constant during the rotation of the oscillation gear 533. This means that the center hole 534 is less likely to contribute to the angular transmission error.

Unlike the center hole 534, the three shaft holes 536 are formed at positions eccentric from the center point C. When the point P approaches one of the three shaft holes 536, deformation is likely to occur around the shaft hole 536 which the point P approaches. Therefore, the shaft holes 536 become a cause of the angular transmission error.

<Control Principles>

Figure 5:
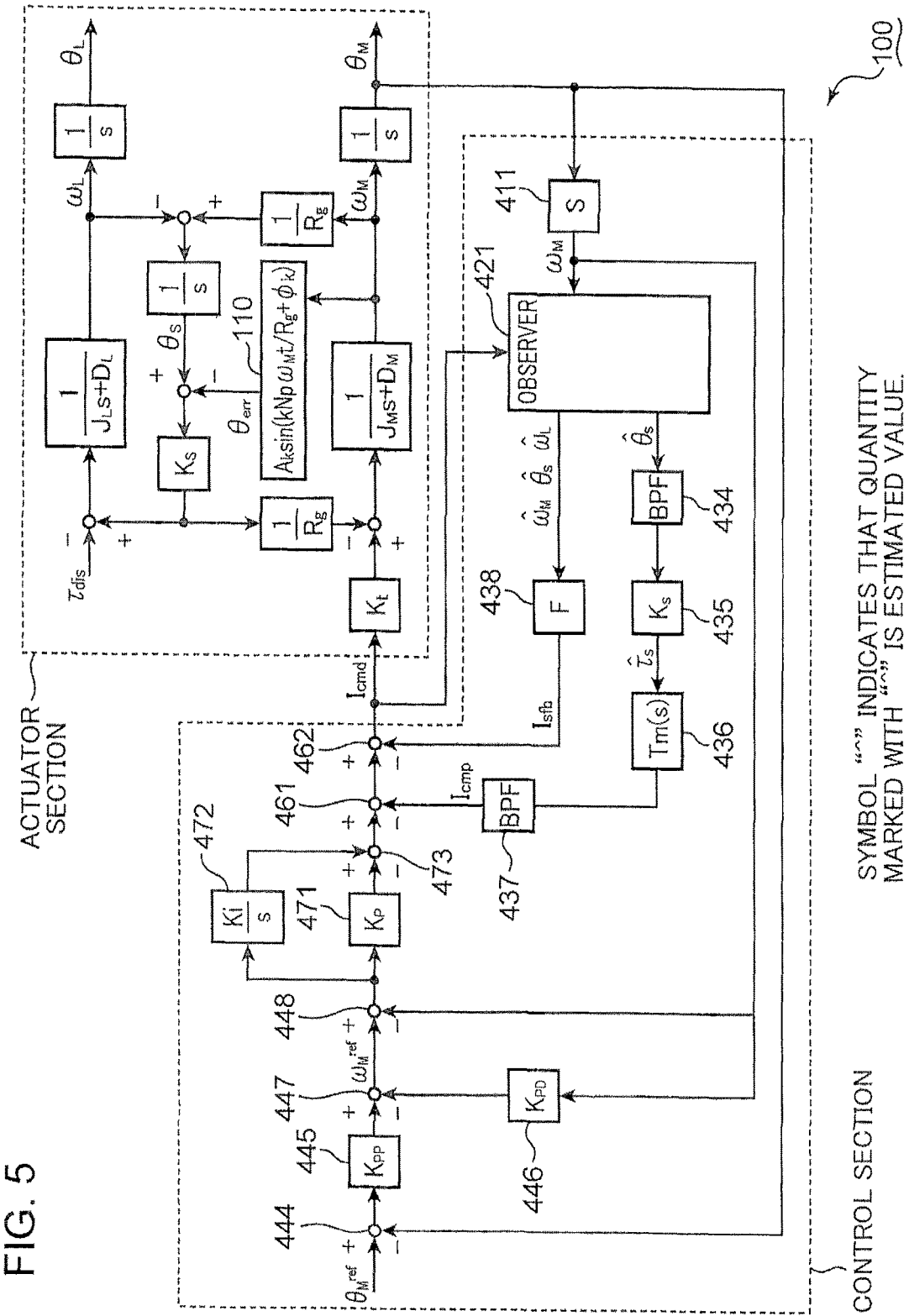
FIG. 5 is a control block diagram of the speed reducer system shown in FIG. 1.

FIG. 5 is a control block diagram of the speed reduction system 100. The speed reduction system 100 is further described with reference to FIGS. 1, 2A, 3 and 5.

The control block diagram shown in FIG. 5 is divided into an actuator section and a control section. The actuator section shows the motor 200 and the oscillatory cyclo-speed reducer 500 described with reference to FIG. 1. The control section shows the control circuit 400 described with reference to FIG. 1.

A block representing a vibration component of the angular transmission error, which is caused by the holes formed in the oscillatory gear portion, is added to a general two-mass resonant model to create the actuator section. Since the two-mass resonant model is known, a vibration component block 110 for calculating a vibration component (hereinafter, referred to as a vibration component $\theta_{eer}$) because of the shaft holes 536 is mainly described. The following table shows the definition of symbols used in the actuator section.

TABLE 1

| Symbol | Definition |
| --- | --- |
| $J_M$ | Inertia Moment of Motor Shaft |
| $J_L$ | Inertia Moment of Load Shaft |
| $D_M$ | Viscous Friction Coefficient of Motor Shaft |
| $D_L$ | Viscous Friction Coefficient of Load Shaft |
| $K_s$ | Spring Characteristics of Oscillatory Cyclo-Speed Reducer |
| $R_g$ | Speed Reduction Ratio of Oscillatory Cyclo-Speed Reducer |
| $\tau_{dis}$ | Disturbance Torque |
| $\theta_M$ | Rotational Angle of Motor |
| $\omega_M$ | Angular Velocity of Motor |
| $\theta_L$ | Rotational Angle of Oscillatory Cyclo-Speed Reducer |
| $\omega_L$ | Angular Velocity of Oscillatory Cyclo-Speed Reducer |
| $K_t$ | Torque Constant |

The vibration component block 110 calculates the vibration component $\theta_{err}$ from the following equation.

$$\theta_{err} = A_k \sin\left(\frac{kN_P\omega_M}{R_g}t + \phi_k\right) \qquad \text{[Equation 2]}$$

$A_k$: amplitude of vibration component
k: number of holes of oscillatory gear portion
$N_p$: number of internal teeth meshed with the oscillatory gear portion
$\omega_M$: angular velocity of motor
$R_g$: speed reduction ratio of oscillatory cyclo-speed reducer
$\phi_k$: phase of vibration component The amplitude $A_k$ may be considered as a variable affected by a load which is applied to the oscillatory cyclo-speed reducer 500. If there is a large load applied to the oscillatory cyclo-speed reducer 500, the amplitude $A_k$ may be a large value. If there is a small load applied to the oscillatory cyclo-speed reducer 500, the amplitude $A_k$ may be a small value.

The phase $\phi_k$ may be considered as a variable determined by a structure of the oscillatory cyclo-speed reducer 500. A value of the phase $\phi_k$ may be determined on the basis of an arrangement pattern of the holes formed in the oscillatory gear portion and other structural factors.

The aforementioned equation may be utilized to calculate vibration components $\theta_{err}$ of various structures of the oscillatory cyclo-speed reducer 500. The oscillatory gear portion of the oscillatory cyclo-speed reducer 500 may include one oscillation gear. Alternatively, the oscillatory gear portion of the oscillatory cyclo-speed reducer 500 may include a plurality of oscillation gears. Therefore, the number k of the holes of the oscillatory gear portion may be expressed by the following equation.

$$K = N_g \times k_e \qquad \text{[Equation 3]}$$

$N_g$: number of oscillation gears
$k_e$: number of holes formed in each oscillation gear If the aforementioned "Equation 3" is applied to the oscillatory cyclo-speed reducer 500A described with reference to FIG. 2A, a value of "$N_g$" is "2" (first and second oscillation gears 531, 532). "$k_e$" means the number of the holes contributing to the angular transmission error. Therefore, if the aforementioned "Equation 3" is applied to the oscillatory cyclo-speed reducer 500A described with reference to FIG. 2A, a value of "$k_e$" is "3" (three shaft holes 536 (c.f. FIG. 3)).

In the actuator section, a quantity obtained by subtracting the vibration component $\theta_{err}$ from the axial torsional vibration $\theta_s$ calculated from the two-mass resonant model is processed as the angular transmission error. The control section is configured to reduce the vibration component $\theta_{err}$.

A differentiation block 411 is shown in the control section. The differentiation block 411 differentiates the rotational angle $\theta_M$ of the motor 200 to calculate the angular velocity $\omega_M$ of the motor 200. The differentiation block 411 corresponds to the differentiator 410 described with reference to FIG. 1.

An observer 421 is shown in the control section. The observer 421 calculates an angular frequency $\omega_d$ of the angular transmission error (i.e. angular frequency component in the aforementioned "Equation 2"). The angular frequency $\omega_d$ may be expressed by the following equation.

$$\omega_d = \frac{k N_P \omega_M}{R_g} \quad \text{[Equation 4]}$$

k: number of holes of oscillatory gear portion
$N_p$: number of internal teeth
$\omega_M$: angular velocity of motor
$R_g$: speed reduction ratio of oscillatory cyclo-speed reducer If the aforementioned "Equation 4" is applied to the oscillatory cyclo-speed reducer 500A described with reference to FIG. 2A, a value of "$N_p$" is the number of the internal-tooth pins 512.

The observer 421 uses a discrete-time state-space model including the angular frequency $w_d$ as a matrix component to estimate the axial torsional vibration $\theta_s$. The observer 421 may use the aforementioned discrete-time state-space model to further estimate the angular velocity $\omega_M$ of the motor 200 and the angular velocity $\omega_L$ of the oscillatory cyclo-speed reducer 500. The observer 421 corresponds to the state observer 420 described with reference to FIG. 1.

A first BPF block 434, a torque calculation block 435, a dynamic compensator 436 and a second BPF block 437 are shown in the control section. Axial torsional vibration data indicating the estimated axial torsional vibration $\theta_s$ is output from the observer 421 to the first BPF block 434. The first BPF block 434 functions as a band-pass filter for extracting a frequency component varying at the angular frequency $\omega_d$ of the angular transmission error from the axial torsional vibration data. The axial torsional vibration data processed by the first BPF block 434 is output to the torque calculation block 435, The torque calculation block 435 multiplies the axial torsional vibration $\theta_s$ by a transmission function $K_s$ indicating the spring characteristics of the oscillatory cyclo-speed reducer 500 to generate torque vibration data indicating a torque vibration $\tau_s$ vibrating at the angular frequency $\omega_d$. The torque vibration data is output from the torque calculation block 435 to the dynamic compensator 436. In this embodiment, the torque calculator is exemplified by the first BPF block 434 and the torque calculation block 435, The torque vibration $\tau_s$ calculated by the torque calculation block 435 corresponds to a torque vibration, which is caused by the holes formed in the oscillatory gear portion. The dynamic compensator 436 calculates a compensation current value $I_{cmp}$ to reduce the torque vibration $\tau_s$, and generates current data. The current data indicating the compensation current value $I_{cmp}$ is output from the dynamic compensator 436 to the second BPF block 437, The second BPF block 437 functions as a band-pass filter for extracting a frequency component varying at the angular frequency $\omega_d$ of the angular transmission error from the current data. The compensation current value $I_{cmp}$ used in the correction of a command current value is eventually determined by data about the extracted frequency component. In this embodiment, the current calculator is exemplified by the dynamic compensator 436 and the second BPF block 437. The first BPF block 434, the torque calculation block 435, the dynamic compensator 436 and the second BPF block 437 correspond to the first current determiner 431 described with reference to FIG. 1.

A state feedback block 438 for executing a state feedback control is shown in the control section. As described above, the data indicating the estimated value of the axial torsional vibration $\theta_s$, the data indicating the estimated value of the angular velocity $\omega_M$ of the motor 200 and the data indicating the estimated value of the angular velocity $\omega_L$ of the oscillatory cyclo-speed reducer 500 are output from the observer 421 to the state feedback block 438. The state feedback block 438 uses the data indicating the estimated value of the axial torsional vibration $\theta_s$, the data indicating the estimated value of the angular velocity $\omega_M$ of the motor 200 and the data indicating the estimated value of the angular velocity $\omega_L$ of the oscillatory cyclo-speed reducer 500 to determine a state feedback current value $I_{sfb}$ indicating a magnitude of the state feedback current. Various computing techniques about the state feedback control may be applied to the state feedback block 438. The control principles of this embodiment are not limited to a specific computing technique for determining the state feedback current value $I_{sfb}$.

Addition points 461, 462 are shown in the control section. The positive compensation current value $I_{cmp}$ is added to the command current value $I_{cmd}$ at the addition point 461. The negative state feedback current value $I_{sfb}$ is added to the command current value $I_{cmd}$ at the addition point 462. The addition points 461, 462 correspond to the correction processor 433 described with reference to FIG. 1.

An addition point 444 is shown in the control section. A signal indicating a target rotational angle $\theta_M^{ref}$ of the motor 200 instructed by an external device (not shown) is input to the addition point 444. In addition, a signal indicating the rotational angle $\theta_M$ of the motor 200 is input to the addition point 444. The signal indicating the rotational angle $\theta_M$ of the motor 200 corresponds to a signal generated by the encoder 300 described with reference to FIG. 1. A difference between target rotational angle $\theta_M^{ref}$ and the rotational angle $\theta_M$ of the motor 200 is calculated at the addition point 444. The addition point 444 corresponds to the position command generator 441 described with reference to FIG. 1.

A proportional term block 446 showing a transmission function $K_{pp}$ used as a proportional term of the PD control, a derivative term block 446 showing a transmission function $K_{pd}$ used as a derivative term of the PD control, and addition points 447, 448 are shown in the control section. The difference between the target rotational angle $\theta_M^{ref}$ and the rotational angle $\theta_M$ of the motor 200 is multiplied by the transmission function $K_{pp}$ in the proportional term block 445. The angular velocity $\omega_M$ of the motor 200 calculated by the differentiation block 411 is multiplied by the transmission function $K_{pd}$ in the derivative term block 446. A difference value obtained as a result of these multiplications is determined as a velocity command value $\omega_M^{ref}$ at the addition point 447.

The velocity command value $\omega_M^{ref}$ is input to the addition point 448. The angular velocity $\omega_M$ of the motor 200 calculated by the differentiation block 411 is also input to the addition point 448. A difference between the velocity command value $\omega_M^{ref}$ and the angular velocity $\omega_M$ (velocity deviation) is calculated at the addition point 448. The proportional term block 445, the derivative term block 446 and the addition points 447, 448 correspond to the velocity command generator 442 described with reference to FIG. 1.

A proportional term block 471 showing a transmission function $K_p$ used as a proportional term in the PI control, an integral term block 472 showing a transmission function K is used as an integral term in the PI control and an addition point 473 are shown in the control section. Data about the velocity deviation calculated at the addition point 448 is processed in each of the proportional term block 471 and the integral term block 472. Data obtained by the processes in the proportional term block 471 and data obtained by the processes in the integral term block 472 are added at the addition point 473. Accordingly, the command current value $I_{cmd}$ is determined. The proportional term block 471, the integral term block 472 and the addition point 473 correspond to the current command generator 443 described with reference to FIG. 1.

As described above, the command current value $I_{cmd}$ is corrected by the compensation current value $I_{cmp}$ and the state feedback current value $I_{sfb}$ at the addition points 461, 462. A current of a magnitude defined by the corrected command current value $I_{cmd}$ is then supplied to the motor 200.

Figure 6:
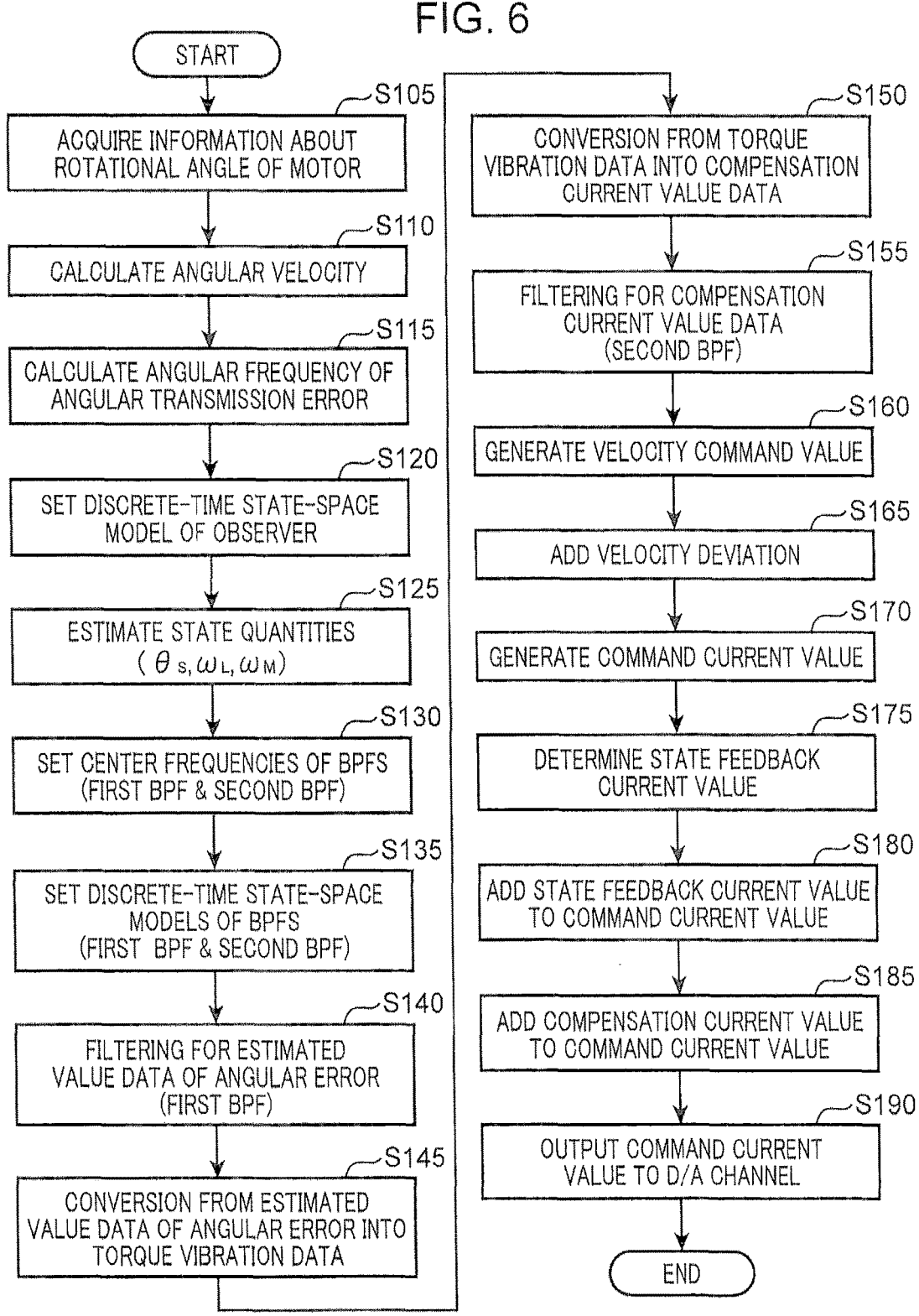
FIG. 6 is a schematic flow chart showing an exemplificative control operation of a control circuit of the speed reducer system shown in FIG. 5.

FIG. 6 is a schematic flow chart showing an exemplificative control operation of the control circuit 400. The control operation of the control circuit 400 is described with reference to FIGS. 1, 5 and 6.

(Step S105)

In Step S105, the encoder 300 detects a rotational angle $\omega_M$ of the motor 200. A signal indicating the detected rotational angle $\theta_M$ is output from the encoder 300 to the differentiator 410 (differentiation block 411). Step S110 is then performed.

(Step S110)

In Step S110, the differentiator 410 (differentiation block 411) calculates an angular velocity $\omega_M$ of the motor 200. The angular velocity $\omega_M$ may be calculated by the following equation. Step S115 is performed after the calculation of the angular velocity $\omega_M$.

$$\omega_M = \frac{(\theta_M[k] - \theta_M[k-1])}{T_s} \quad \text{[Equation 5]}$$

$\theta_M[k]$: present rotational angle of motor
$\theta_M[k-1]$: rotational angle of motor obtained in one previous sampling
$T_s$: sampling interval (Step S115)

In Step S115, the state observer 420 (observer 421) calculates an angular frequency $\omega_d$ of the angular transmission error (c.f. the aforementioned "Equation 4"). Step S120 is then performed.

(Step S120)

In Step S120, a discrete-time state-space model of the state observer 420 (observer 421) is set. The angular frequency $\omega_d$ calculated in Step S115 is used as a matrix component of the discrete-time state-space model. Step S125 is performed after the discrete-time state-space model is set.

(Step S125)

In Step S125, the state observer 420 (observer 421) estimates state quantities such as the axial torsional vibration $\theta_s$ (c.f. the aforementioned "Equation 1"), the angular velocity $\omega_M$ of the motor 200 and the angular velocity $\omega_L$ of the oscillatory cyclo-speed reducer 500. Data indicating an estimated value of the axial torsional vibration $\theta_s$ is output to the first current determiner 431. The data indicating the estimated value of the axial torsional vibration $\theta_s$, data indicating an estimated value of the angular velocity $\omega_M$ of the motor 200 and data indicating an estimated value of the angular velocity $\omega_L$ of the oscillatory cyclo-speed reducer 500 are output to the second current determiner 432. Step S130 is then performed.

(Step S130)

In Step S130, the first current determiner 431 sets a center frequency $\omega$ of the first and second BPF blocks 434, 437. The center frequency $\omega$ of the first and second BPF blocks 434, 437 may be calculated from the equation for calculating the angular frequency $\omega_d$ described with reference to the aforementioned "Equation 4" (i.e. $\omega=\omega_d$). Step S135 is performed after the center frequency $\omega$ is set.

(Step S135)

In Step S135, the first current determiner 431 sets a discrete-time state-space model of the first and second BPF blocks 434, 437. The center frequency $\omega$ calculated in Step S130 is used as a matrix component of the discrete-time state-space model of the first and second BPF blocks 434, 437. Step S140 is performed after the discrete-time state-space model is set.

(Step S140)

In Step S140, the first current determiner 431 (first BPF block 434) extracts a frequency component varying at the angular frequency $\omega$ from the data indicating the estimated value of the axial torsional vibration $\theta_s$. Step S145 is then performed.

(Step S145)

In Step S145, the first current determiner 431 (torque calculation block 435) generates torque vibration data indicating the torque vibration $\tau_s$ from the data indicating the estimated value of the axial torsional vibration $\theta_s$. Since unnecessary frequency components are removed from the data indicating the estimated value of the axial torsional vibration $\theta_s$ in Step S140, the first current determiner 431 (torque calculation block 435) may accurately calculate a torque vibration $\tau_s$. Step S150 is performed after the torque vibration data is generated.

(Step S150)

In Step S150, the first current determiner 431 (dynamic compensator 436) calculates the compensation current value $I_{cmp}$ from the torque vibration data. Step S155 is then performed.

(Step S155)

In Step S155, the first current determiner 431 (second BPF block 437) extracts a frequency component varying at the angular frequency w from the data indicating the compensation current value $I_{cmp}$, and determines the compensation current value $I_{cmp}$, which is used for the correction of the command current value $I_{cmd}$. Since unnecessary frequency components are removed from the data indicating the compensation current value $I_{cmp}$ in Step S155, the command current value $I_{cmd}$ is accurately corrected by the compensation current value $I_{cmp}$. Step S160 is performed after the compensation current value $I_{cmp}$ is determined.

(Step S160)

In Step S160, the command information generator 440 (position command generator 441 and velocity command generator 442) calculates a velocity command value $\omega_M^{ref}$. The velocity command value $\omega_M^{ref}$ may be calculated from the following equation. Step S165 is performed after the calculation of the velocity command value $\omega_M^{ref}$.

$$\omega_M^{ref} = (\theta_M^{ref} - \theta_M) \cdot K_{PP} \cdot \omega_M \cdot K_{PD} \quad \text{[Equation 6]}$$

(Step S165)

In Step S165, the velocity deviation is added. The processes in Step S165 may be expressed by the following equation. Step S170 is performed after the addition of the velocity deviation.

$$\omega_{M\_int} \mathrel{+}= \omega_M^{Ref} - \omega_M \qquad \text{[Equation 7]}$$

(Step S170)

In Step S170, the current command generator 443 calculates the command current value $I_{cmd}$. The command current value $I_{cmd}$ may be calculated from the following equation. Step S175 is performed after the calculation of the command current value $I_{cmd}$.

$$I_{cmd} = (\omega_M^{ref} - \omega_M) \cdot K_P + \omega_{M\_int} \cdot T_s \cdot K_I \qquad \text{[Equation 8]}$$

(Step S175)

In Step S175, the second current determiner 432 (state feedback block 438) calculates the state feedback current value $I_{sfb}$. The state feedback current value $I_{sfb}$ may be calculated from the following equation. Step S180 is performed after the calculation of the state feedback current value $I_{sfb}$.

$$I_{sfb} = f_{\omega M} \cdot \omega_M + f_{\theta s} \cdot s + f_{\omega L} \cdot \omega_L \qquad \text{[Equation 9]}$$

(Step S180)

In Step S180, the correction processor 433 (addition point 462) adds the negative state feedback current value $I_{sfb}$ to the command current value $I_{cmd}$. The processes in Step S180 may be expressed by the following equation. Step S185 is performed after the addition of the state feedback current value $I_{cmp}$ to the command current value $I_{cmd}$.

$$I_{cmd} \mathrel{-}= I_{sfb} \qquad \text{[Equation 10]}$$

(Step S185)

In Step S185, the correction processor 433 (addition point 461) adds the positive compensation current value $I_{cmp}$ to the command current value $I_{cmd}$. The processes in Step S185 may be expressed by the following equation. Step S190 is performed after the addition of the compensation current value $I_{cmp}$ to the command current value $I_{cmd}$.

$$I_{cmd} \mathrel{+}= I_{cmpo} \qquad \text{[Equation 11]}$$

(Step S190)

In Step S190, the correction processor 433 outputs the command current value $I_{cmd}$ to a D/A channel of the driver 450. The driver 450 outputs to the motor 200 a drive signal in correspondence to the command current value $I_{cmd}$.

<State Observer>

The state observer 420 (observer 421) is described with reference to FIGS. 1, 5 and 6.

With regard to the actuator section shown in FIG. 5, a state variable x and an input u are expressed by the following equation.

$$x = [\omega_M, \theta_S, \omega_L, \theta_{err}, \dot{\theta}_{err}, \tau_{dis}]^T \qquad \text{[Equation 12]}$$

$u = I_q$ $I_q$: supply current

A state equation in the actuator section shown in FIG. 5 is given by the following equation.

$$\dot{x} = Ax + Bu \qquad \text{[Equation 13]}$$
$$y = Cx$$

-continued $$A = \begin{bmatrix} -\dfrac{D_M}{J_M} & -\dfrac{K_s}{R_g J_M} & 0 & \dfrac{K_s}{R_g J_M} & 0 & 0 \\ \dfrac{1}{R_g} & 0 & -1 & 0 & 0 & 0 \\ 0 & \dfrac{K_s}{J_L} & -\dfrac{D_L}{J_L} & -\dfrac{K_L}{J_L} & 0 & -\dfrac{1}{J_L} \\ 0 & 0 & 0 & 0 & 1 & 0 \\ 0 & 0 & 0 & -\omega_d^2 & 0 & 0 \\ 0 & 0 & 0 & 0 & 0 & 0 \end{bmatrix}$$

$$B = \begin{bmatrix} \dfrac{K_L}{J_M} & 0 & 0 & 0 & 0 & 0 \end{bmatrix}^T$$

$$C = [1 \ 0 \ 0 \ 0 \ 0 \ 0]$$

The state equation and matrices of the state observer 420 (observer 421) in a continuous system are given by the following equation. In the following equation, "$u_0$" denotes a matrix expressing inputs to the state observer 420 (observer 421), $$\dot{x}_0 = \hat{A} x_0 + \hat{B} u_0$$

$$y_0 = \hat{C} x_0$$

$$\hat{A} = A - KC$$

$$\hat{B} = [BK]$$

$$\hat{C} = I \qquad \text{[Equation 14]}$$

The following equation and matrices are obtained by transforming the aforementioned continuous-time model into a discrete-time model, $$x_d[k+1] = \hat{A}_d x_d[k] + \hat{B}_d u_d[k]$$

$$y_d[k+1] = \hat{C}_d x_d[k]$$

$$\hat{A}_d = 1 + \hat{A} T_s$$

$$\hat{B}_d = \hat{B} T$$

$$\hat{C}_d = \hat{C} \qquad \text{[Equation 15]}$$

The matrices shown in the aforementioned Equation 15 are computed in Step S120 described with reference to FIG. 6.

<Band-Pass Filters>

The first and second BPF blocks 434, 437 are described with reference to FIGS. 5 and 6, The transmission function of the first and second BPF blocks 434, 437 may be expressed by the following equation. In the following equation, "Q" denotes a quality factor for determining sharpness (passband width) of a gain curve.

$$BPF(s) = \dfrac{\dfrac{\omega}{Q} s}{s^2 + \dfrac{\omega}{Q} s + \omega^2} \qquad \text{[Equation 16]}$$

The following matrices are obtained by transformation from the continuous-time models of the first and second BPF blocks 434, 437 into discrete-time models.

$$\hat{A}_d = 1 + AT_s \quad \text{[Equation 17]}$$

$$\hat{B}_d = T_s B$$

$$\hat{C}_d = C$$

$$A = \begin{bmatrix} -\dfrac{\omega}{Q} & -\omega^2 \\ 1 & 0 \end{bmatrix}$$

$$B = \begin{bmatrix} 1 & 0 \end{bmatrix}^T$$

$$C = \begin{bmatrix} \dfrac{\omega}{Q} & 0 \end{bmatrix}$$

The matrices shown in the aforementioned Equation 17 are computed in Step S130 described with reference to FIG. 6.

<Dynamic Compensator>

The dynamic compensator 436 is described with reference to FIGS. 5 and 6.

The dynamic compensator 436 is set as an inverse system of a transmission function from the compensation current value $I_{cmp}$ to the disturbance torque $\tau_{dis}$. The dynamic compensator 436 is expressed by the following equation.

$$T_m(s) = \dfrac{b_3 s^3 + b_2 s^2 + b_1 s + b_0}{a_1 s} \quad \text{[Equation 18]}$$

$$b_3 = R_g^2 J_M$$

$$b_2 = R_g^2 D_M + R_g^2 K_P K_{PD} K_t + R_g^2 K_P K_t + R_g^2 f_{\omega M} K_t$$

$$b_1 = R_g^2 K_i K_{PD} K_t + R_g^2 K_i K_t + R_g^2 K_P K_{PP} K_t + R_g^2 f_{\theta s} K_t + K_s$$

$$b_0 = R_g^2 K_i K_{PP} K_t$$

$$a_0 = R_g K_t K_s$$

<Verification Test>

The inventors et al. used a speed reducer constructed on the basis of the design principles of the oscillatory cyclo-speed reducer 500A described with reference to FIG. 2A to verify reduction effect for an angular transmission error. The used speed reducer includes two oscillation gears ($N_g$=2) and 40 internal-tooth pins ($N_p$=40). Each of the oscillation gears is provided with three shaft holes ($k_e$=3).

Since the speed reducer includes 40 internal-tooth pins, the crankshaft has to make 40 turns for each of the oscillation gears to cause one circulating motion along the inner wall of the outer cylinder. While the crankshaft makes one turn, a rigidity variation occurs six times in each oscillation gear. Therefore, 240 rigidity variations occur in the speed reducer while each oscillation gear makes one circulating motion along the inner wall of the outer cylinder.

Figure 7A:
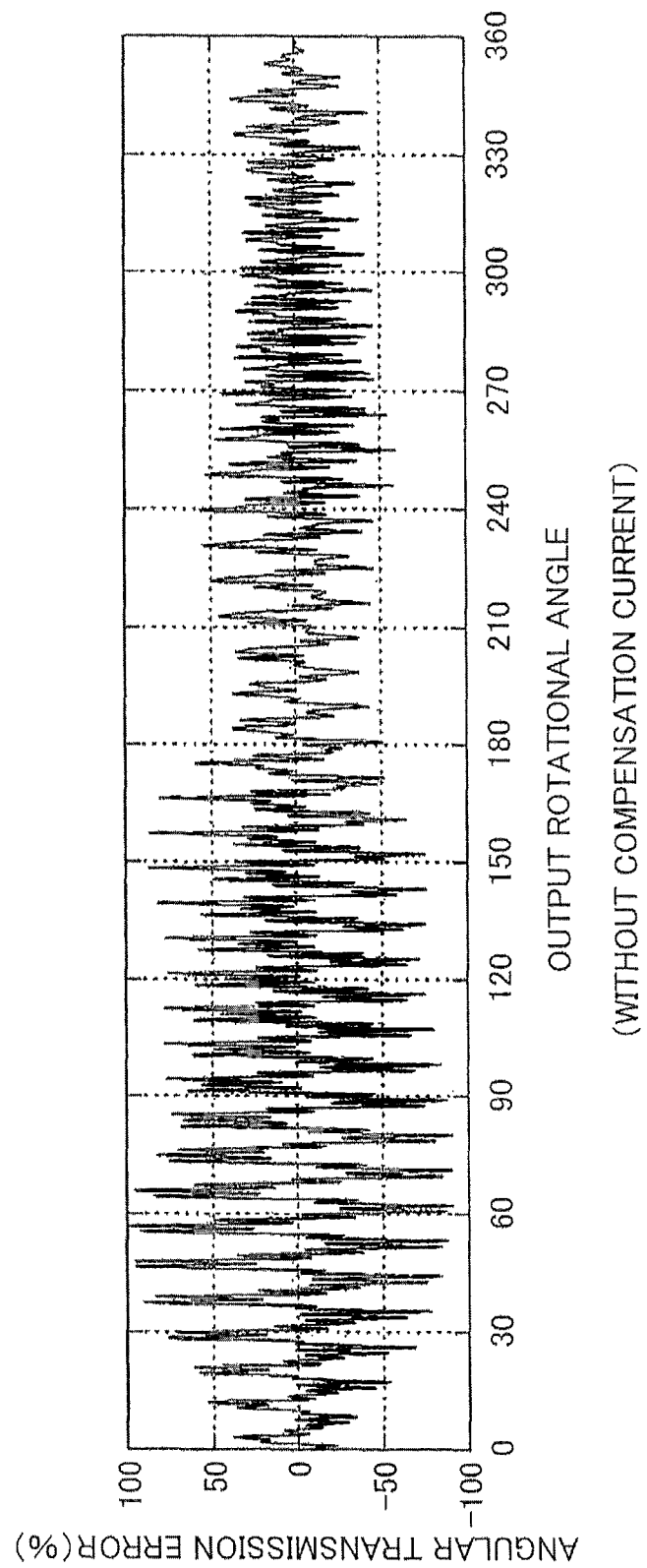
FIG. 7A shows experimental data acquired under a condition without correction by a compensation current value.

FIGS. 7A and 7B are graphs showing results of the verification test. FIG. 7A shows experimental data acquired under a condition without correction by the compensation current value. FIG. 7B shows experimental data acquired under a condition with a correction by the compensation current value.

The horizontal axes of FIGS. 7A and 7B represent an output rotational angle of the speed reducer. The vertical axes of FIGS. 7A and 7B represent the angular transmission error. The angular transmission errors shown in FIGS. 7A and 7B are normalized and expressed in percentage. Since the scale reductions of the vertical axes are equal between the graphs of FIGS. 7A and 7B, there may be a direct comparison between the angular transmission errors shown in FIGS. 7A and 7B.

It was verified from the data comparison between FIGS. 7A and 7B that the angular transmission error was reduced by about 30% under the condition with the correction by the compensation current value.

The inventors et al. used the data shown in FIGS. 7A and 7B to carry out FFT analyses. If the angular transmission error is reduced by the control principles of this embodiment, an angular frequency component at 240 is reduced by the compensation current.

Figure 8A:
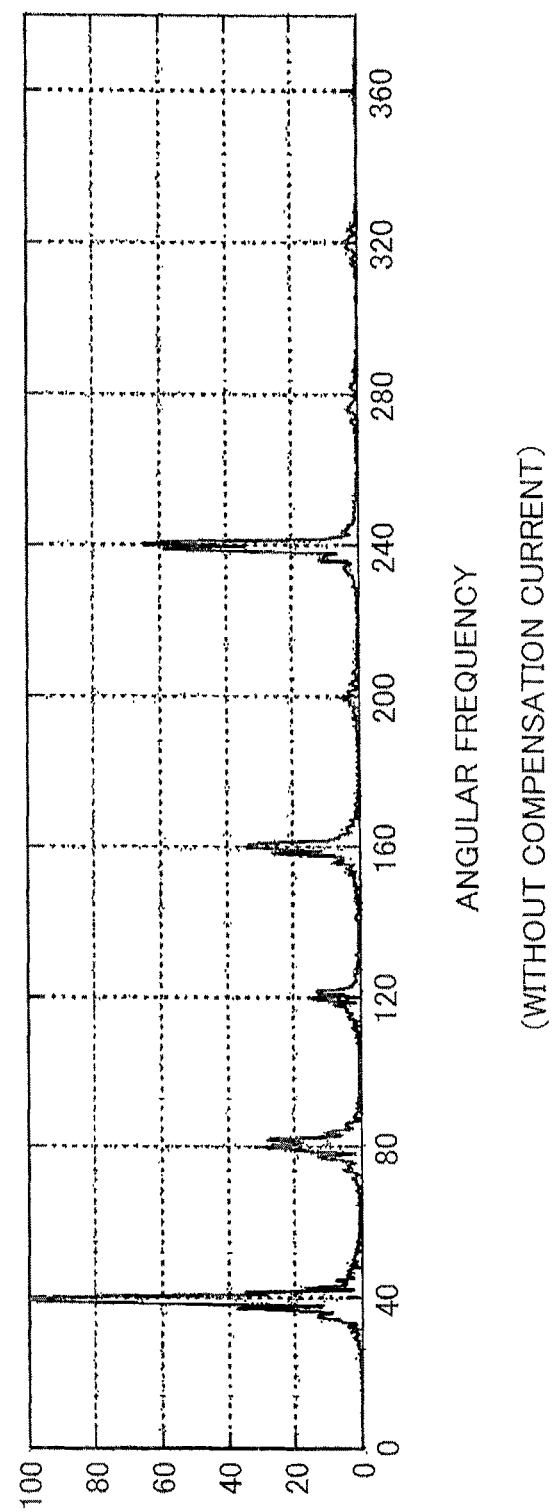
FIG. 8A shows a result of an FFT analysis obtained from the data shown in FIG. 7A.
Figure 8B:
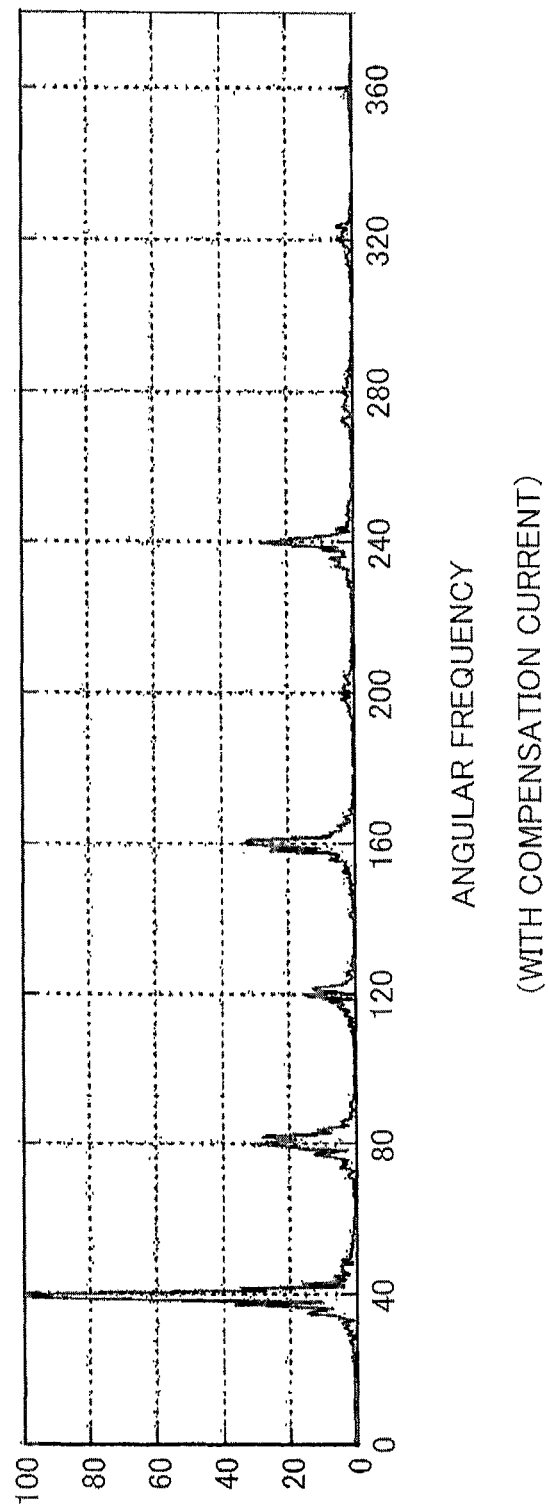
FIG. 8B shows a result of an FFT analysis obtained from the data shown in FIG. 7B.

FIGS. 8A and 8B are graphs showing results of the FFT analyses, FIG. 8A shows the result of the FFT analysis obtained from the data shown in FIG. 7A. FIG. 8B shows the result of the FFT analysis obtained from the data shown in FIG. 7B.

The horizontal axes of the graphs of FIGS. 8A and 8B represent the angular frequency. It was found from the comparison between the graphs of FIGS. 8A and 8B that the angular frequency component at 240 was largely reduced. Therefore, it was verified that the control principles of this embodiment effectively reduced the angular transmission error.

Second Embodiment

Figure 9:
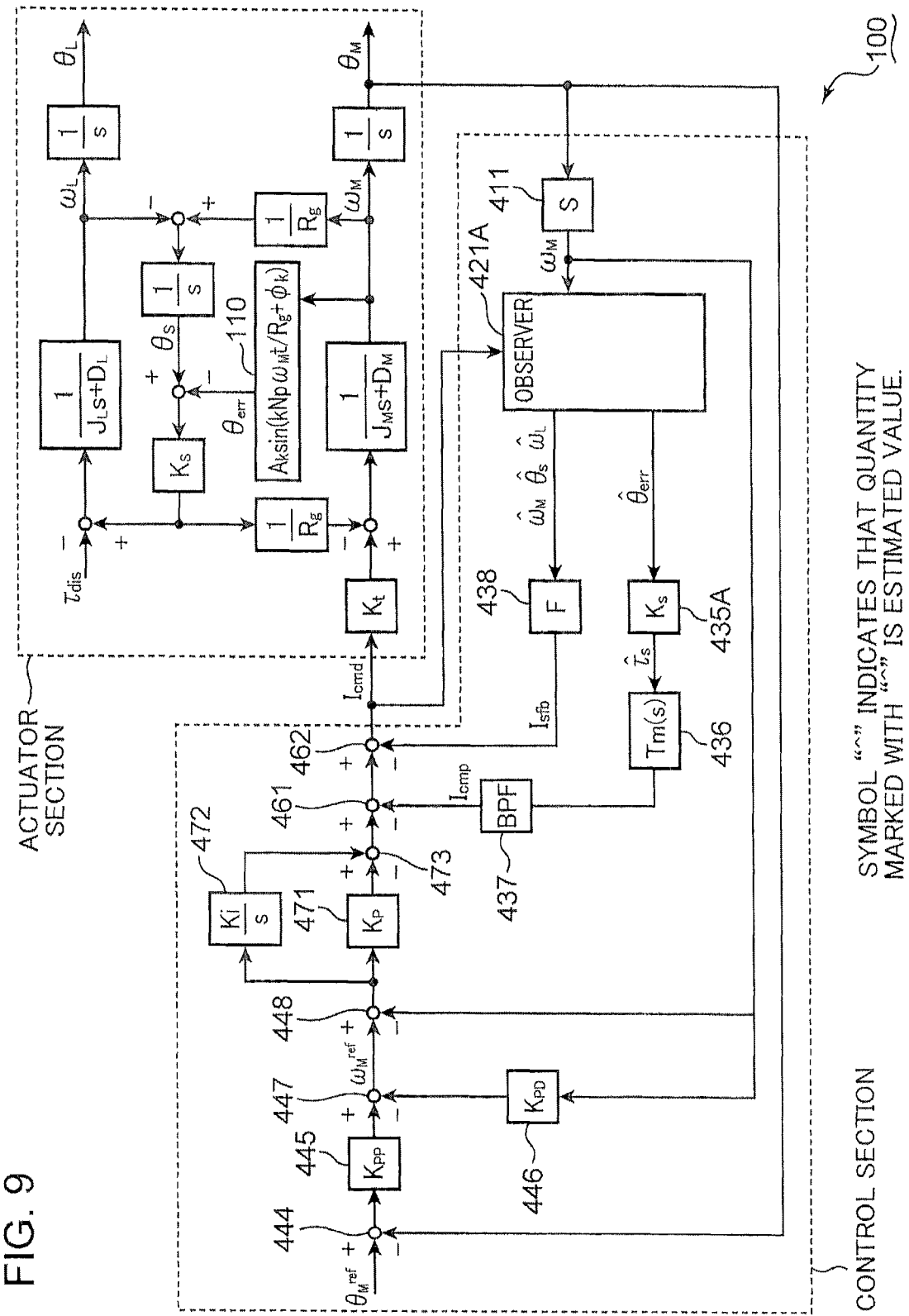
FIG. 9 is a control block diagram of a speed reducer system (second embodiment)

The observer described in the context of the first embodiment outputs an axial torsional vibration. Alternatively, the observer may output a vibration component caused by holes which are formed in a gear portion. A speed reducer system including an observer configured to output a vibration component caused by holes which are formed in a gear portion is described in the second embodiment, FIG. 9 is a control block diagram of the speed reducer system 100 (c.f. FIG. 1). Signs and symbols commonly used between the first and second embodiments mean that elements denoted by the common signs and symbols have the same functions as the first embodiment. Therefore, the description of the first embodiment is applicable to these elements. The speed reducer system 100 is described with reference to FIGS. 1, 5 and 9.

Like the first embodiment, the control block diagram shown in FIG. 9 is divided into an actuator section and a control section. The actuator section shows the motor 200 and the oscillatory cyclo-speed reducer 500 described with reference to FIG. 1. The control section shows the control circuit 400 described with reference to FIG. 1. The structure of the actuator section is the same as the first embodiment. Therefore, the description of the first embodiment is applicable to the actuator section.

Like the first embodiment, the control section includes the differentiation block 411, the dynamic compensator 436, the second BPF block 437, the state feedback block 438, the addition points 444, 447, 448, 461, 462 and 473, the proportional term blocks 445, 471, the derivative term block 446 and the integral term block 472. The description of the first embodiment is applicable to these elements.

The control section further includes an observer 421A and a torque calculation block 435A. Unlike the first embodiment, the observer 421A outputs a vibration component $\theta_{err}$. Since the state variable x includes the vibration component $\theta_{err}$ as a matrix component as shown by the aforementioned "Equation 12", the observer 421A may be structurally the same as the observer 421 described with reference to FIG. 5.

Unlike the first embodiment, the vibration component $\theta_{err}$ is directly output from the observer 421A to the torque calculation block 435A. The torque calculation block 435A multiplies the vibration component $\theta_{err}$ by the transmission function $K_s$ indicating spring characteristics of the oscillatory cyclo-speed reducer 500 (c.f. FIG. 1) to generate torque vibration data indicating a torque vibration $\tau_s$ which vibrates at an angular frequency $\omega_d$. The torque vibration data is output from the torque calculation block 435A to the dynamic compensator 436. In this embodiment, the torque calculator is exemplified by the torque calculation block 435A.

The torque vibration $\tau_s$ calculated by the torque calculation block 435A corresponding to a torque vibration caused by holes which are formed in an oscillatory gear portion. The dynamic compensator 436 calculates a compensation current value $I_{cmp}$ to reduce the torque vibration $\tau_s$ and generates current data. The current data indicating the compensation current value $I_{cmp}$ is output from the dynamic compensator 436 to the second BPF block 437.

The second BPF block 437 functions as a band-pass filter for extracting a frequency component from the current data, the frequency component varying at the angular frequency $\omega_d$ of the angular transmission error. The compensation current value $I_{cmp}$ used for the correction to a command current value is eventually determined by data about the extracted frequency component.

Figure 10:
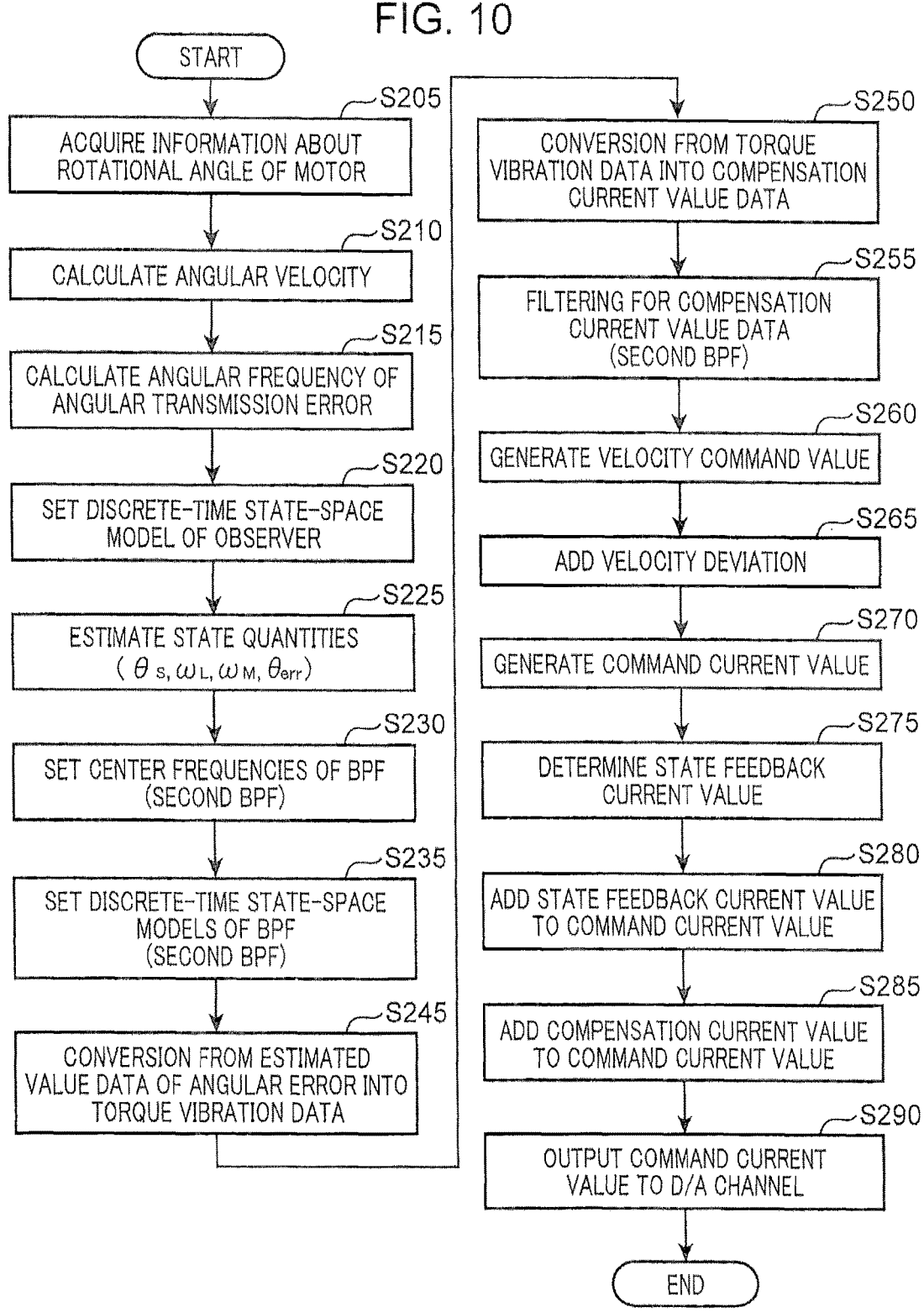
FIG. 10 is a schematic flow chart showing an exemplificative control operation of the speed reducer system shown in FIG. 9.

FIG. 10 is a schematic flow chart showing an exemplificative control operation of the speed reducer system 100. The control operation of the control circuit 400 is described with reference to FIGS. 1, 9 and 10.

(Step S205)

In Step S205, the encoder 300 detects a rotational angle $\theta_M$ of the motor 200. A signal indicating the detected rotational angle $\theta_M$ is output from the encoder 300 to the differentiator 410 (differentiation block 411). Step S210 is then performed.

(Step S210)

In Step S210, the differentiator 410 (differentiation block 411) calculates an angular velocity $\omega_M$ of the motor 200. The angular velocity $\omega_M$ may be calculated by the aforementioned "Equation 5". Step S215 is performed after the calculation of the angular velocity $\omega_M$.

(Step S215)

In Step S215, the state observer 420 (observer 421A) calculates an angular frequency $\omega_d$ of the angular transmission error (c.f. the aforementioned "Equation 4"). Step S220 is then performed.

(Step S220)

In Step S220, a discrete-time state-space model of the state observer 420 (observer 421A) is set. The angular frequency $\omega_d$ calculated in Step S215 is used as a matrix component of the discrete-time state-space model. Step S225 is performed after the discrete-time state-space model is set.

(Step S225)

In Step S225, the state observer 420 (observer 421A) estimates state quantities such as the axial torsional vibration $\theta_s$ (c.f. the aforementioned "Equation 1"), the angular velocity $\omega_M$ of the motor 200, the angular velocity $\omega_L$ of the oscillatory cyclo-speed reducer 500, and the vibration component $\theta_{err}$. Data indicating an estimated value of the axial torsional vibration $\theta_s$ is output to the first current determiner 431. The data indicating the estimated value of the axial torsional vibration $\theta_s$ data indicating an estimated value of the angular velocity $\omega_M$ of the motor 200 and data indicating an estimated value of the angular velocity $\omega_L$ of the oscillatory cyclo-speed reducer 500 are output to the second current determiner 432. Step S230 is then performed.

(Step S230)

In Step S230, the first current determiner 431 sets a center frequency $\omega$ of the second BPF block 437. The center frequency $\omega$ of the second BPF block 437 may be calculated from the equation for calculating the angular frequency $\omega_d$ described with reference to the aforementioned "Equation 4" (i.e. $\omega = \omega_d$). Step S235 is performed after the center frequency $\omega$ is set.

(Step S235)

In Step S235, the first current determiner 431 sets a discrete-time state-space model of the second BPF block 437. The angular frequency $\omega$ calculated in Step S230 is used as a matrix component of the discrete-time state-space model of the second BPF block 437. Step S245 is performed after the discrete-time state-space model is set.

(Step S245)

In Step S245, the first current determiner 431 (torque calculation block 435A) generates torque vibration data indicating the torque vibration $\tau_s$ from the data indicating the estimated value of the vibration component $\theta_{err}$. Step S250 is performed after the torque vibration data is generated.

(Step S250)

In Step S250, the first current determiner 431 (dynamic compensator 436) calculates the compensation current value $I_{cmp}$ from the torque vibration data, Step S255 is then performed.

(Step S255)

In Step S255, the first current determiner 431 (second BPF block 437) extracts a frequency component varying at the angular frequency $\omega$ from the data indicating the compensation current value $I_{cmp}$, and determines the compensation current value $I_{cmp}$ used for the correction of the command current value $I_{cmp}$. Since unnecessary frequency components are removed from the data indicating the compensation current value $I_{cmp}$ in Step S255, the command current value $I_{cmp}$ is accurately corrected by the compensation current value $I_{cmp}$. Step S260 is performed after the compensation current value $I_{cmp}$ is determined.

(Step S260)

In Step S260, the command information generator 440 (position command generator 441 and velocity command generator 442) calculates a velocity command value $\omega_M^{ref}$. The velocity command value $\omega_M^{ref}$ may be calculated from the aforementioned "Equation 6". Step S265 is performed after the calculation of the velocity command value $\omega_M^{ref}$.

(Step S265)

In Step S265, a velocity deviation is added. The processes in Step S265 may be expressed by the aforementioned "Equation 7". Step S270 is performed after the addition of the velocity deviation.

(Step S270)

In Step S270, the current command generator 443 calculates the command current value $I_{cmp}$. The command current value $I_{cmp}$ may be calculated from the aforementioned "Equation 8". Step S275 is performed after the calculation of the command current value $I_{cmp}$.

(Step S275)

In Step S275, the second current determiner 432 (state feedback block 438) calculates the state feedback current value $I_{sfb}$. The state feedback current value $I_{cmp}$ may be calculated from the aforementioned "Equation 9". Step S280 is performed after the calculation of the state feedback current value $I_{sfb}$.

(Step S280)

In Step S280, the correction processor 433 (addition point 462) adds the negative state feedback current value $I_{sfb}$ to the command current value $I_{cmp}$. The processes in Step S280 may be expressed by the aforementioned "Equation 10". Step S285 is performed after the addition of the state feedback current value $I_{sfb}$ to the command current value $I_{cmp}$.
(Step S285)

In Step S285, the correction processor 433 (addition point 461) adds the positive compensation current value $I_{cmp}$ to the command current value $I_{cmd}$. The processes in Step S285 may be expressed by the aforementioned "Equation 11". Step S290 is performed after the addition of the compensation current value $I_{cmp}$ to the command current value $I_{cmp}$.
(Step S290)

In Step S290, the correction processor 433 outputs the command current value $I_{cmp}$ to a D/A channel of the driver 450. A drive signal in correspondence to the command current value $I_{cmp}$ is output from the driver 450 to the motor 200.

Third Embodiment

The observers described in the context of the first and second embodiments may estimate an angular error in light of a disturbance torque which rapidly changes like a step function. However, a system incorporating a speed reducer may receive a periodically changing disturbance load. A speed reducer system configured to reduce an angular transmission error even under an environment in which there is a periodically changing disturbance load is described in the third embodiment.

Figure 11:
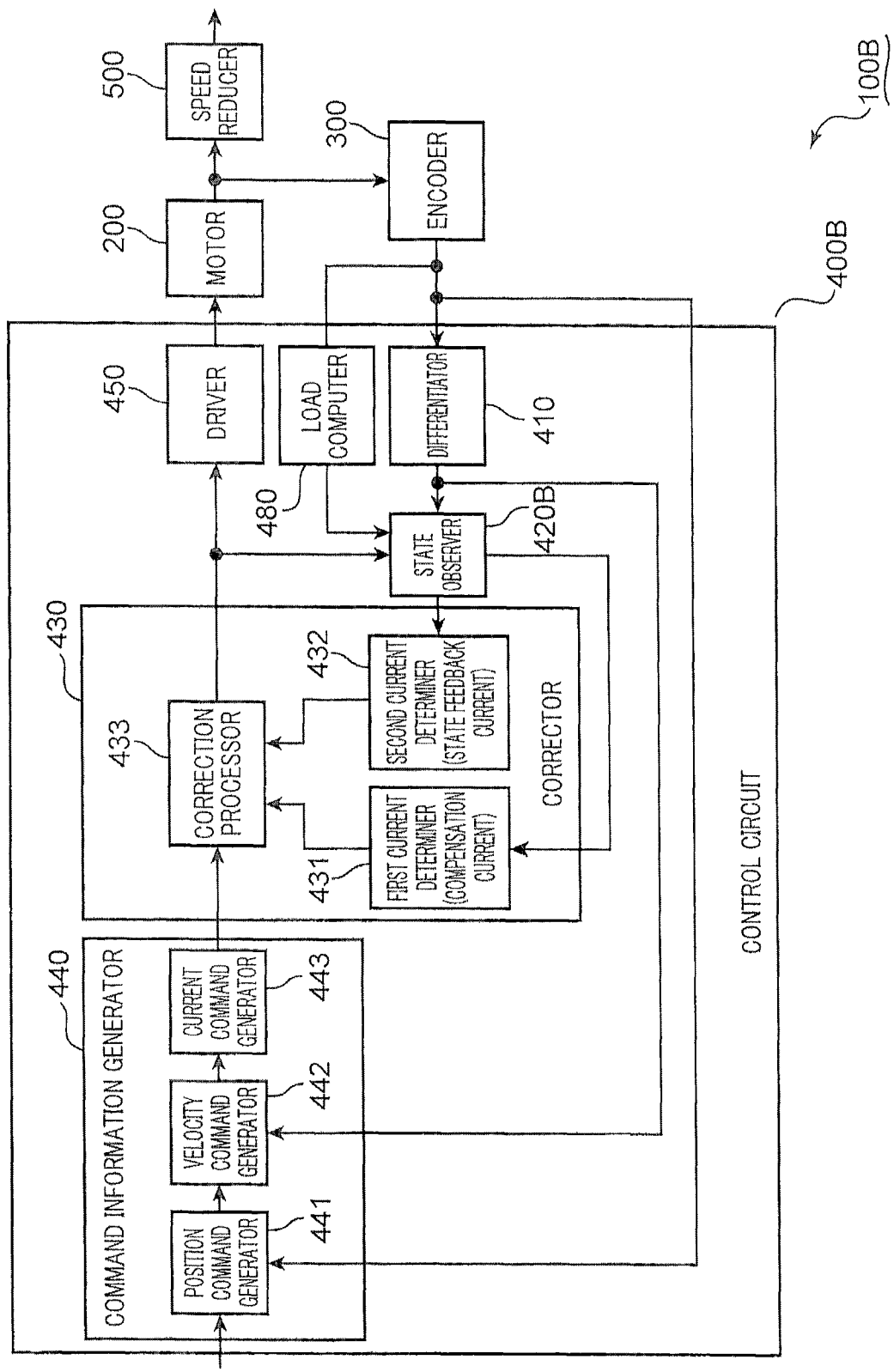
FIG. 11 is a schematic block diagram showing an exemplificative functional configuration of a speed reducer system of the third embodiment.

FIG. 11 is a schematic block diagram showing an exemplificative functional configuration of a speed reducer system 100B. Signs and symbols commonly used in the first and third embodiments mean that elements denoted by the common signs and symbols have the same functions as the first embodiment. Therefore, the description of the first embodiment is applicable to these elements. The speed reducer system 100B is described with reference to FIG. 11.

Like the first embodiment, the speed reducer system 100B includes the motor 200, the encoder 300 and the oscillatory cyclo-speed reducer 500. The description of the first embodiment is applicable to these elements.

The speed reducer system 100B further includes a control circuit 400B. Like the first embodiment, the control circuit 400B includes the differentiator 410, the corrector 430, the command information generator 440 and the driver 450. The description of the first embodiment is applicable to these elements.

The control circuit 400B further includes a state observer 420B and a load computer 480. Like the first embodiment, the state observer 420B receives angular velocity information about an angular velocity of the motor 200 from the differentiator 410. The load computer 480 performs computational processes for a periodically varying high-order disturbance load (e.g. gravitational load). A result of the computational processes is output from the load computer 480 to the state observer 420B. In this embodiment, the disturbance factor is exemplified by the disturbance load which is processed by the load computer 480.

Figure 12:
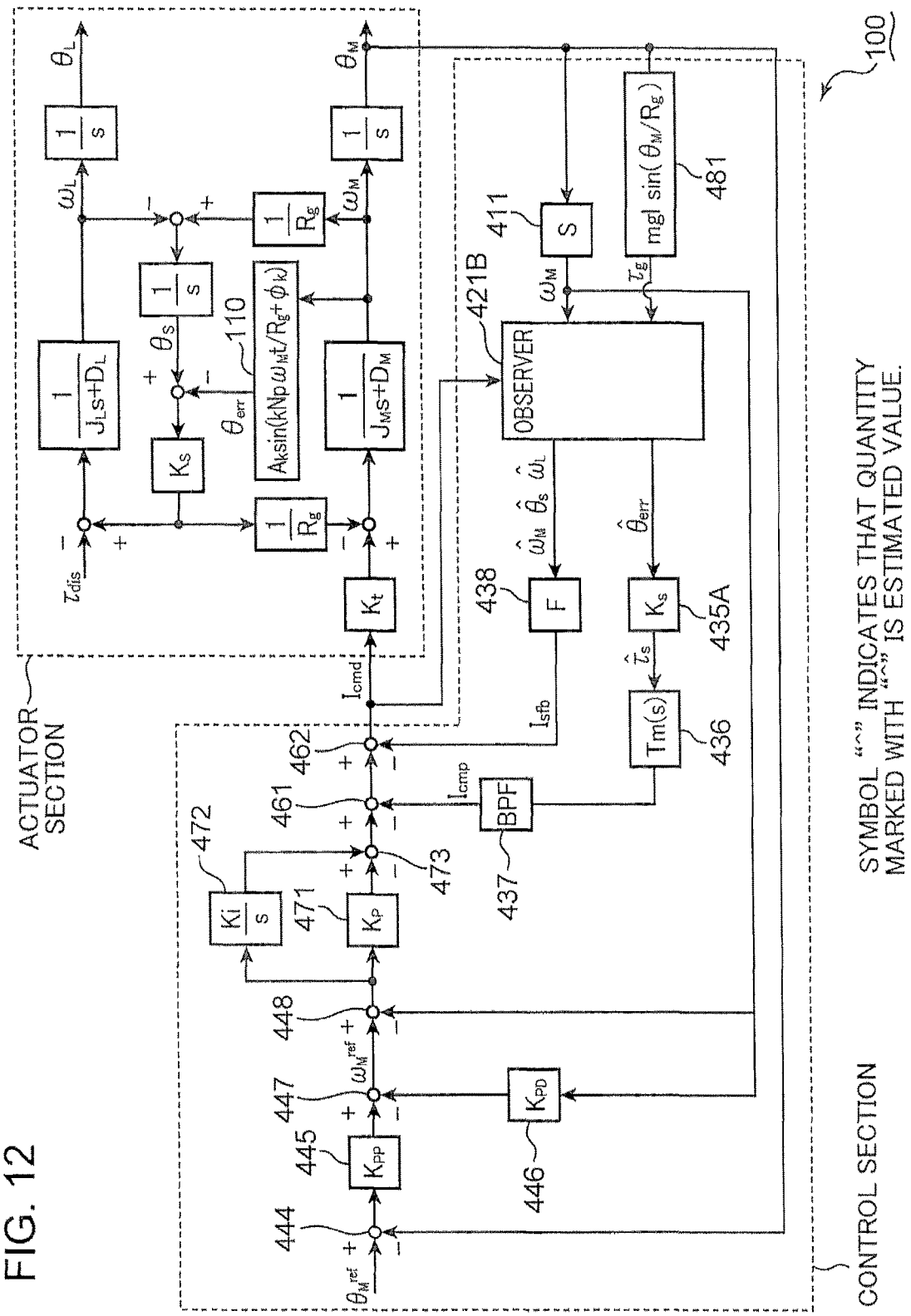
FIG. 12 is a control block diagram of the speed reducer system shown in FIG. 11.

FIG. 12 is a control block diagram of the speed reducer system 100B (c.f. FIG. 11). Signs and symbols commonly used in the second and third embodiments mean that elements denoted by the common signs and symbols have the same functions as the second embodiment. Therefore, the description of the second embodiment is applicable to these elements. The speed reducer system 100B is described with reference to FIGS. 11 and 12.

Like the second embodiment, the control block diagram shown in FIG. 12 is divided into an actuator section and a control section. The actuator section shows the motor 200 and the oscillatory cyclo-speed reducer 500 described with reference to FIG. 11. The control section shows the control circuit 400B described with reference to FIG. 11. The structure of the actuator section is the same as the second embodiment. Therefore, the description of the second embodiment is applicable to the actuator section.

Like the second embodiment, the control section includes the differentiation block 411, the torque calculation block 435A, the dynamic compensator 436, the second BPF block 437, the state feedback block 438, the addition points 444, 447, 448, 461, 462 and 473, the proportional term blocks 445, 471, the derivative term block 446 and the integral term block 472. The description of the second embodiment is applicable to these elements. [0181]

The control section further includes an observer 421B and a load computation block 481. The load computation block 481 uses the following equation to compute a periodically varying high-order disturbance load $\tau_g$.

$$\tau_g = mgl \sin\frac{\theta_M}{R_g} \quad \text{[Equation 19]}$$

The disturbance load $\tau_g$ is output from the load computation block 481 to the observer 421B. The observer 421B uses the angular velocity $\omega_M$ of the motor 200 and the disturbance load $\tau_g$ as inputs to output various estimated values described in the context of the second embodiment. Since the disturbance load $\tau_g$ is utilized as an input to the observer 421B, the matrix "$u_0$" in the aforementioned "Equation 14" includes the disturbance load $\tau_g$ as a matrix component.

Figure 13:
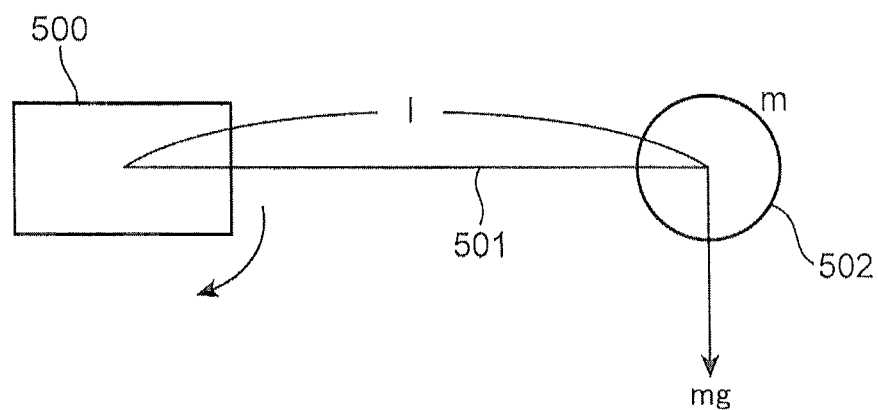
FIG. 13 is a conceptual model of an equation indicating a disturbance load.

FIG. 13 is a conceptual model of the equation expressed in the aforementioned "Equation 19". Symbols used in the aforementioned "Equation 19" are described with reference to FIGS. 12 and 13.

FIG. 13 shows the oscillatory cyclo-speed reducer 500, an arm 501 and a weight 502. The symbol "m" in the aforementioned "Equation 19" means a mass of the weight 502. The symbol "l" in the aforementioned "Equation 19" means a length of the arm 501. The symbol "g" in the aforementioned "Equation 19" means a gravitational acceleration. When the weight 502 swings, a disturbance load following the equation shown in the aforementioned "Equation 19" is generated.

Figure 14:
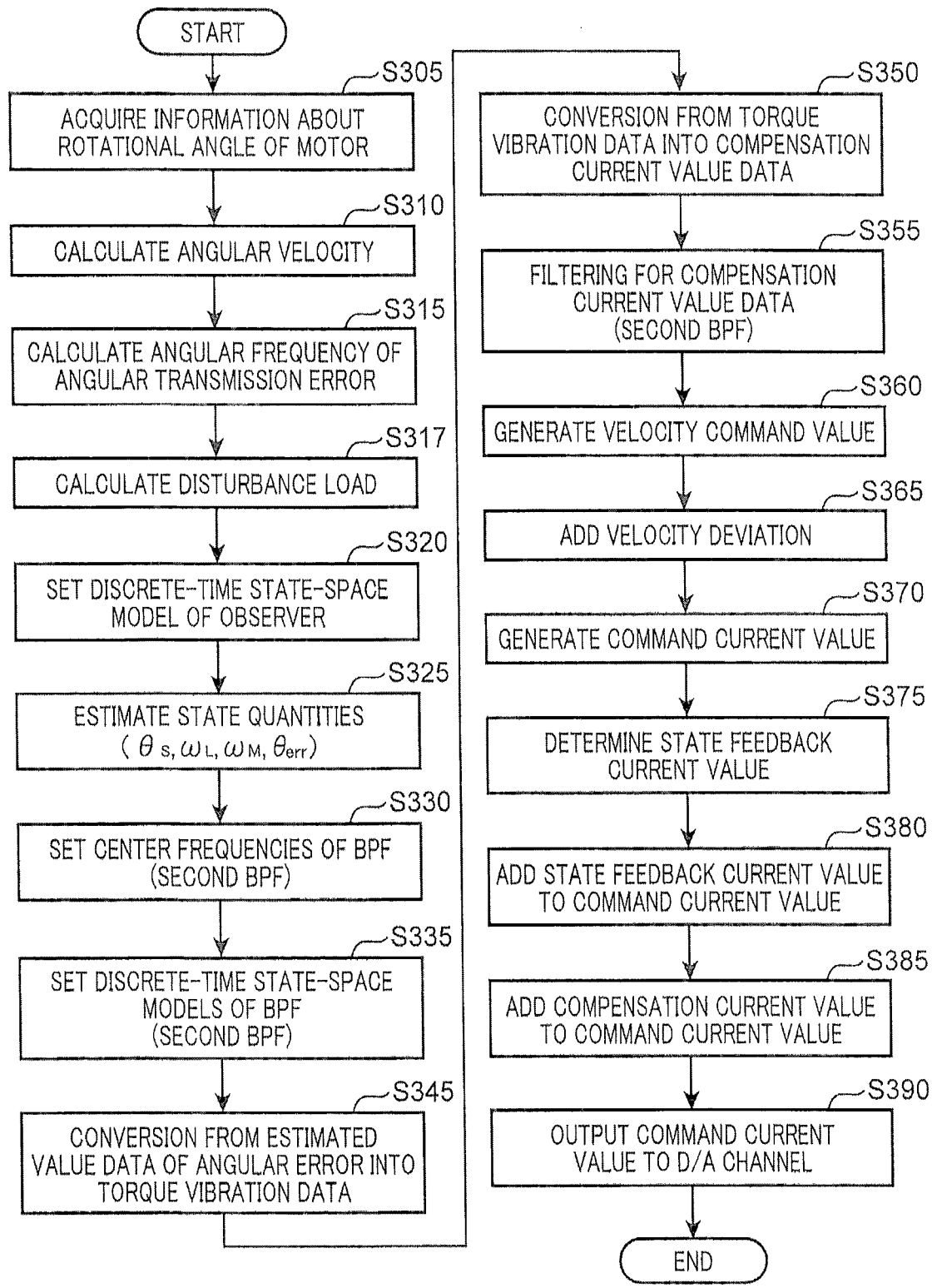
FIG. 14 is a schematic flow chart showing an exemplificative control operation of the speed reducer system shown in FIG. 11.

FIG. 14 is a schematic flow chart showing an exemplificative control operation of the speed reducer system 100B. The control operation of the control circuit 400B is described with reference to FIGS. 11, 12 and 14.
(Step S305)

In Step S305, the encoder 300 detects a rotational angle $\theta_M$ of the motor 200. A signal indicating the detected rotational angle $\theta_M$ is output from the encoder 300 to the differentiator 410 (differentiation block 411). Step S310 is then performed.
(Step S310)

In Step S310, the differentiator 410 (differentiation block 411) calculates an angular velocity $\omega_M$ of the motor 200. The angular velocity $\omega_M$ may be calculated by the aforementioned "Equation 5". Step S315 is performed after the calculation of the angular velocity $\omega_M$.

(Step S315)

In Step S315, the state observer 420B (observer 421B) calculates an angular frequency $\omega_d$ of an angular transmission error (c.f. the aforementioned "Equation 4"). Step S317 is then performed.

(Step S317)

In Step S317, the load computer 480 (load computation block 481) calculates a disturbance load $\tau_g$ (c.f. the aforementioned "Equation 19"). Step S320 is then performed.

(Step S320)

In Step S320, a discrete-time state-space model of the state observer 420B (observer 421B) is set. The angular frequency $\omega_d$ calculated in Step S315 is used as a matrix component of the discrete-time state-space model. The disturbance load $\tau_g$ calculated in Step S317 is used as an input to the state observer 420B (observer 421B). Step S325 is performed after the discrete-time state-space model is set.

(Step S325)

In Step S325, the state observer 420B (observer 421B) estimates state quantities such as the axial torsional vibration $\theta_s$ (c.f. the aforementioned "Equation 1"), the angular velocity $\omega_M$ of the motor 200, the angular velocity $\omega_L$ of the oscillatory cyclo-speed reducer 500 and the vibration component $\theta_{err}$. Data, which indicates an estimated value of the vibration component $\theta_{err}$, is output to the first current determiner 431. Data indicating the estimated value of the axial torsional vibration $\theta_s$, data indicating an estimated value of the angular velocity $\omega_M$ of the motor 200 and data indicating an estimated value of the angular velocity $\omega_L$ of the oscillatory cyclo-speed reducer 500 are output to the second current determiner 432. Step S330 is then performed.

(Step S330)

In Step S330, the first current determiner 431 sets a center frequency $\omega$ of the second BPF block 437. The center frequency $\omega$ of the second BPF block 437 may be calculated from the equation for calculating the angular frequency $\omega_d$ described with reference to the aforementioned "Equation 4" (i.e. $\omega=\omega_d$). Step S335 is performed after the center frequency $\omega$ is set.

(Step S335)

In Step S335, the first current determiner 431 sets a discrete-time state-space model of the second BPF block 437. The angular frequency $\omega$ calculated in Step S330 is used as a matrix component of the discrete-time state-space model of the second BPF block 437. Step S345 is performed after the discrete-time state-space model is set.

(Step S345)

In Step S345, the first current determiner 431 (torque calculation block 435A) generates torque vibration data indicating the torque vibration $\tau_s$ from the data indicating the estimated value of the vibration component $\theta_{err}$. Step S350 is performed after the torque vibration data is generated.

(Step S350)

In Step S350, the first current determiner 431 (dynamic compensator 436) calculates a compensation current value $I_{cmp}$ from the torque vibration data. Step S355 is then performed.

(Step S355)

In Step S355, the first current determiner 431 (second BPF block 437) extracts a frequency component varying at the angular frequency $\omega$ from data indicating the compensation current value $I_{cmp}$, and determines the compensation current value $I_{cmp}$ used for the correction to the command current value $I_{cmd}$. Since unnecessary frequency components are removed from the data indicating the compensation current value $I_{cmp}$ in Step S355, the command current value $I_{cmd}$ is accurately corrected by the compensation current value $I_{cmp}$. Step S360 is performed after the compensation current value $I_{cmp}$ is determined.

(Step S360)

In Step S360, the command information generator 440 (position command generator 441 and velocity command generator 442) calculates a velocity command value $\omega_M^{ref}$. The velocity command value $\omega_M^{ref}$ may be calculated from the aforementioned "Equation 6". Step S365 is performed after the calculation of the velocity command value $\omega_M^{ref}$.

(Step S365)

In Step S365, a velocity deviation is added. The processes in Step S365 may be expressed by the aforementioned "Equation 7". Step S370 is performed after the addition of the velocity deviation.

(Step S370)

In Step S370, the current command generator 443 calculates the command current value $I_{cmd}$. The command current value $I_{cmd}$ may be calculated from the aforementioned "Equation 8". Step S375 is performed after the calculation of the command current value $I_{cmd}$.

(Step S375)

In Step S375, the second current determiner 432 (state feedback block 438) calculates a state feedback current value $I_{sfb}$. The state feedback current value $I_{sfb}$ may be calculated from the aforementioned "Equation 9". Step S380 is performed after the calculation of the state feedback current value $I_{sfb}$.

(Step S380)

In Step S380, the correction processor 433 (addition point 462) adds the negative state feedback current value $I_{sfb}$ to the command current value $I_{cmd}$. The processes in Step S380 may be expressed by the aforementioned "Equation 10". Step S385 is performed after the addition of the state feedback current value $I_{sfb}$ to the command current value $I_{cmd}$.

(Step S385)

In Step S385, the correction processor 433 (addition point 461) adds the positive compensation current value $I_{cmp}$ to the command current value $I_{cmd}$. The processes in Step S385 may be expressed by the aforementioned "Equation 11". Step S390 is performed after the addition of the compensation current value to the command current value $I_{cmd}$.

(Step S390)

In Step S390, the correction processor 433 outputs the command current value $I_{cmd}$ to a D/A channel of the driver 450. The driver 450 outputs to the motor 200 a drive signal in correspondence to the command current value $I_{cmd}$.

<Verification Test>

The inventors et al. used a speed reducer, which had been constructed on the basis of the design principle of the oscillatory cyclo-speed reducer 500A described with reference to FIG. 2A, to verify a reduction effect for an angular transmission error. The used speed reducer includes two oscillation gears ($N_g=2$) and 40 internal-tooth pins ($N_1=40$). Each of the oscillation gears is provided with three shaft holes ($k_e=3$).

Since the speed reducer includes 40 internal-tooth pins, the crankshaft has to make 40 turns for each oscillation gear to cause one circulating motion along the inner wall of the outer cylinder. While the crankshaft makes one turn, a rigidity variation occurs six times in each oscillation gear. Therefore, 240 rigidity variations occur in the speed reducer while each oscillation gear makes one circulating motion along the inner wall of the outer cylinder.

Figure 15A:
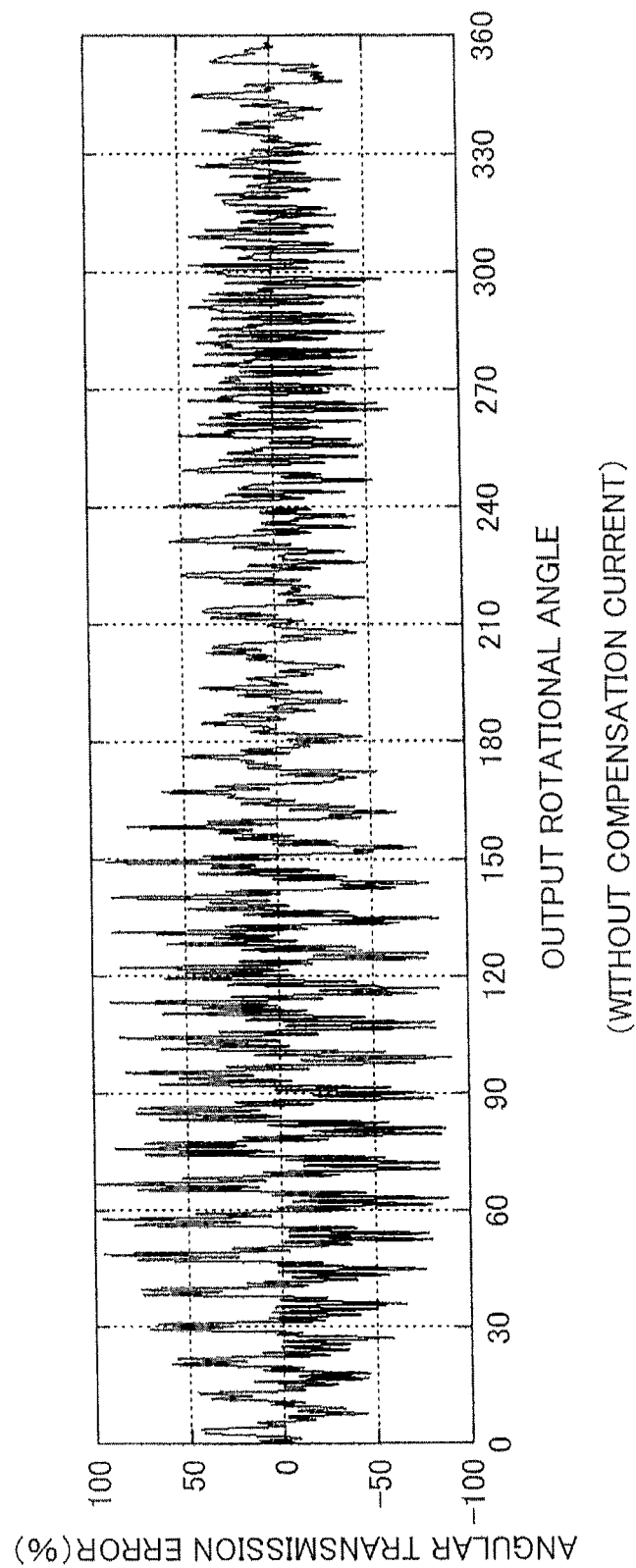
FIG. 15A shows experimental data acquired under a condition without correction by a compensation current value.
Figure 15B:
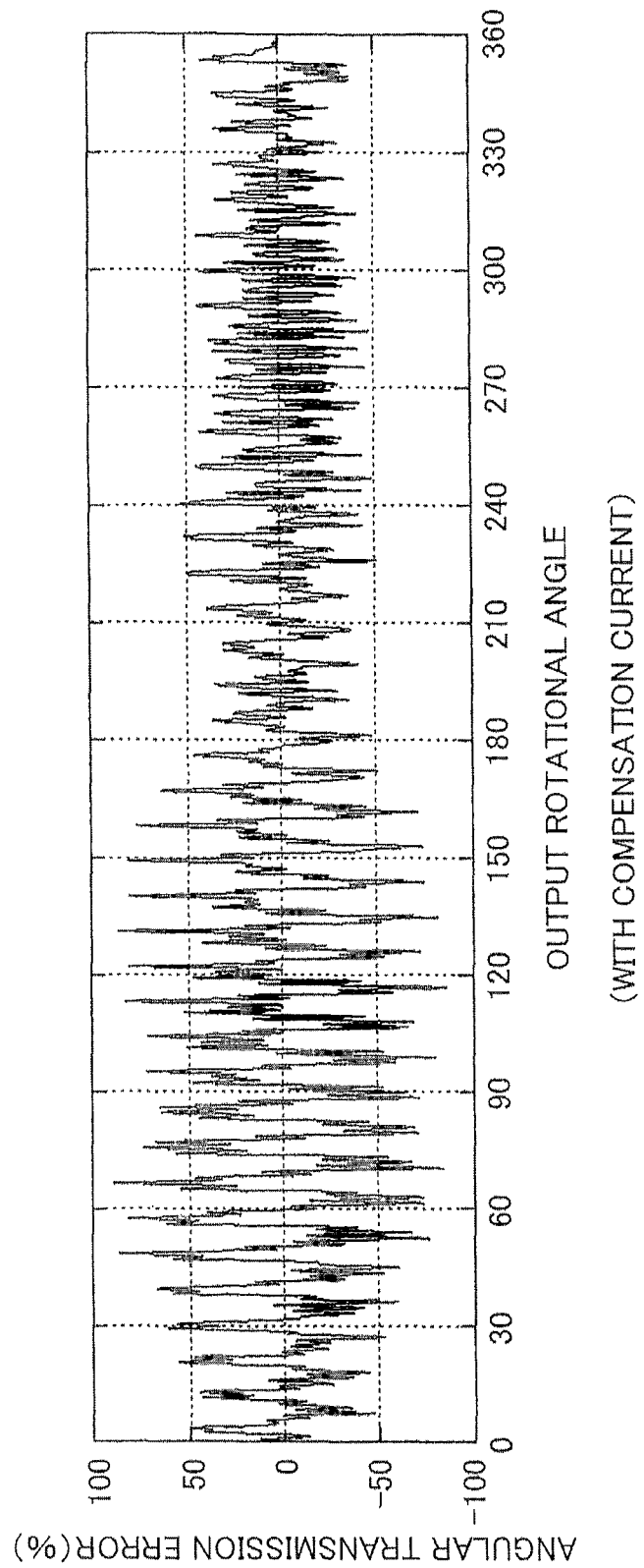
FIG. 15B shows experimental data acquired under a condition with correction by the compensation current value.

FIGS. 15A and 15B are graphs showing results of the verification test. FIG. 15A shows experimental data acquired under a condition without correction by the compensation current value. FIG. 15B shows experimental data acquired under a condition with a correction by the compensation current value.

The horizontal axes of FIGS. 15A and 15B represent an output rotational angle of the speed reducer. The vertical axes of FIGS. 15A and 15B represent the angular transmission error. The angular transmission errors shown in FIGS. 15A and 15B are normalized and expressed in percentage. Since the scale reductions of the vertical axes are equal between the graphs of FIGS. 15A and 15B, the angular transmission error may be directly compared between FIGS. 15A and 15B.

It was verified from the data comparison between FIGS. 15A and 15B that the angular transmission error had been reduced by about 20% under the condition with the correction by the compensation current value.

The inventors et al. used the data shown in FIGS. 15A and 15B to carry out FFT analyses. If the angular transmission error is reduced by the control principles of this embodiment, the angular frequency component at 240 is reduced by the compensation current.

Figure 16B:
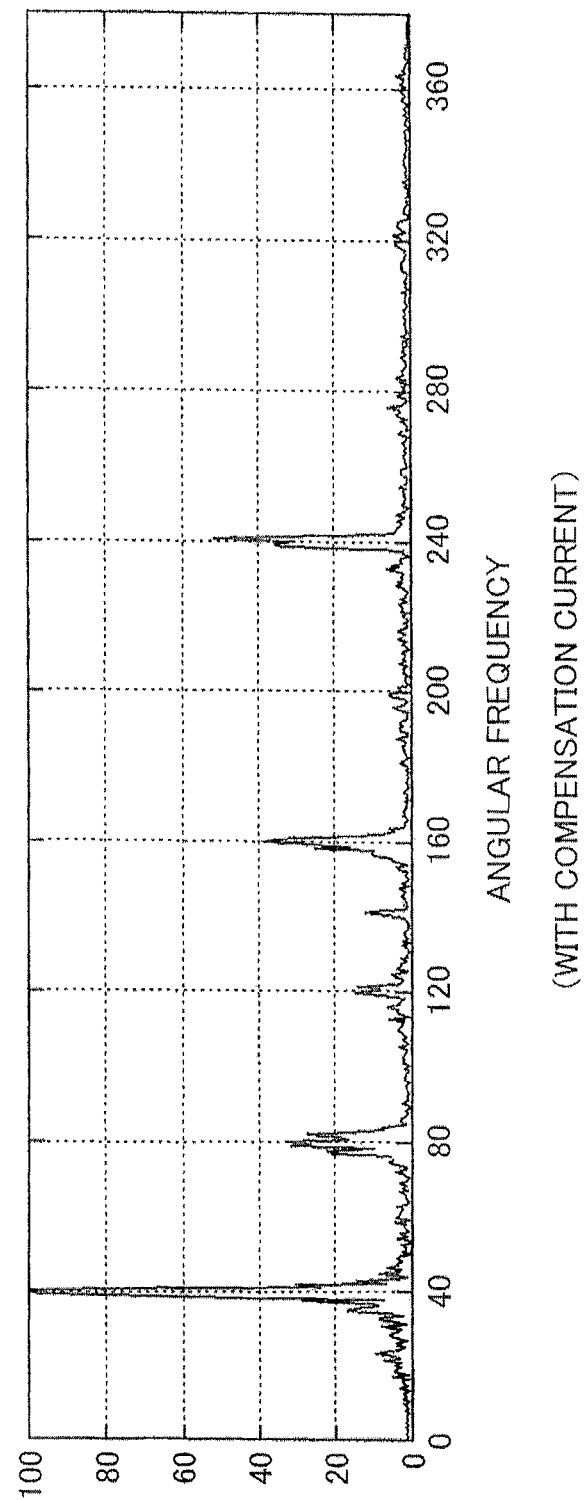
FIG. 16B shows a result of an FFT analysis obtained from the data shown in FIG. 15B.

FIGS. 16A and 16B are graphs showing results of the FFT analysis. FIG. 16A shows the result of the FFT analysis obtained from the data shown in FIG. 15A. FIG. 16B shows the result of the FFT analysis obtained from the data shown in FIG. 15B.

The horizontal axes of the graphs of FIGS. 16A and 16B represent the angular frequency. It was found from the comparison of the graphs between FIGS. 16A and 16B that the angular frequency component at 240 was largely reduced. Therefore, it was verified that the control principles of this embodiment effectively reduced the angular transmission error.

Fourth Embodiment

The inventors et al, developed further improved control techniques on the basis of the control principles described in the context of the first to third embodiments. The improved control techniques are described in the fourth embodiment.

As described the context of the first to third embodiments, the vibration component of the angular frequency $\omega_d$ shown in the aforementioned "Equation 4" largely affects the angular error of the speed reducer. As described above, the vibration component of the angular frequency $\omega_d$ is caused by how many holes are formed in the gear portion. Specifically, the vibration component of the angular frequency $\omega_d$ results from elastic deformation happening to the speed reducer.

It is understood from the graphs shown in FIGS. 8A and 16A that a vibration component of an angular frequency $\omega_{d1}$ defined by the following "Equation 20" also largely affects the angular error of the speed reducer in addition to the vibration component of the angular frequency $\omega_d$ resulting from the elastic deformation happening to the speed reducer. It is considered that the vibration component of the angular frequency $\omega_{d1}$ is resultant from manufacturing errors of the speed reducer. The angular frequency $\omega_{d1}$ defined by the "Equation 20" is equivalent to the substitution of 1 for the variable k in the definition equation of the angular frequency $\omega_d$ shown by the "Equation 4", $$\omega_{d1} = \frac{N_P \omega_M}{R_g}$$ [Equation 20]

The inventors et al. constructed a control model for effectively reducing influences from the vibration component of the angular frequency $\omega_d$ resulting from the elastic deformation happening to the speed reducer and the vibration component of the angular frequency $\omega_{d1}$ resulting from the manufacturing errors of the speed reducer. The control model constructed by the inventors et al. uses the oscillatory cyclo-speed reducer 500A described with reference to FIG. 2A as a controlled object. However, the principles of this embodiment are applicable to various speed reducers different in a quantity of holes formed in a gear portion. Therefore, the principles of this embodiment are not limited to a specific structure of the speed reducer.

Figure 17:
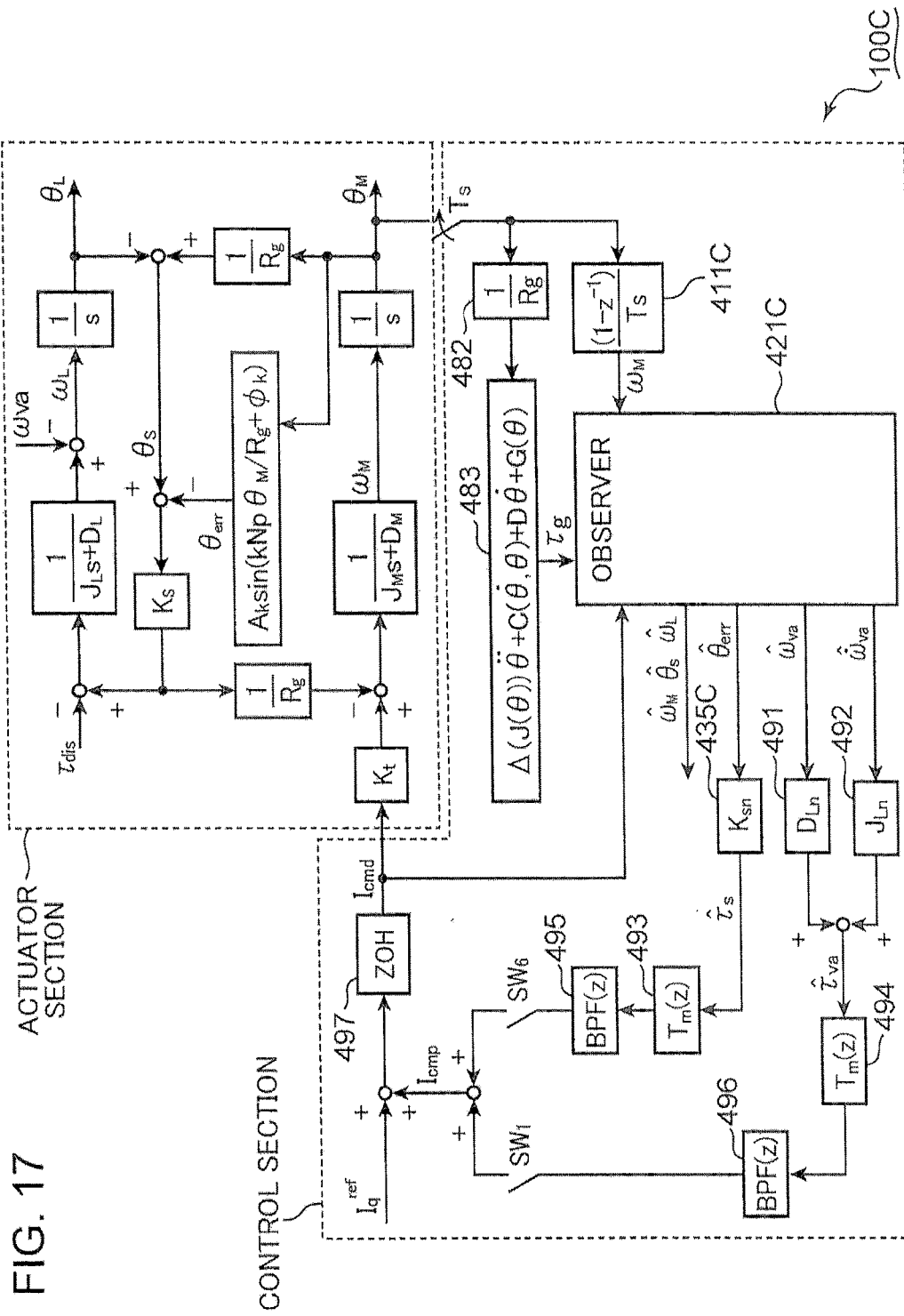
FIG. 17 is a control block diagram of a speed reducer system of the fourth embodiment.

FIG. 17 is a control block diagram of a speed reducer system 100C of the fourth embodiment. Signs and symbols commonly used in the third and fourth embodiments mean that elements denoted by the common signs and symbols have the same functions as the third embodiment. Therefore, the description of the third embodiment is applicable to these elements. The speed reducer system 100C is described with reference to FIGS. 1, 2A, 12 and 17.

Like the third embodiment, the control block diagram shown in FIG. 17 is divided into an actuator section and a control section. The actuator section shown in FIG. 17 differs from the actuator section shown in FIG. 12 only in including an angular frequency $\omega_{va}$ as an input factor. Therefore, the description about the actuator section described with reference to FIG. 12 is applicable to the actuator section shown in FIG. 17. The angular frequency $\omega_{va}$ may be defined by the following "Equation 21".

$$\omega_{va} = A_1 \sin\left(\frac{N_P \omega_M}{R_g} t + \phi_1\right)$$ [Equation 21]

$A_1$: amplitude of vibration component resulting from manufacturing errors of speed reducer
$\phi_1$: phase of vibration component resulting from manufacturing errors of speed reducer Since the speed reducer system 100C is designed to control the oscillatory cyclo-speed reducer 500A shown in FIG. 2A as described above, a numerical value "6" is substituted for the variable "k" in the equation (the aforementioned "Equation 2") in the block for outputting the vibration component $\theta_{err}$ in the actuator section.

"$T_s$" in the control section means a sampling interval. The sampling interval "$T_s$" may be determined by a resolution of the encoder 300 described with reference to FIG. 1.

The control section includes blocks 482, 483. The "J-term" in the equation shown in the block 483 denotes a dynamic component caused by an inertia variation. The "C-term" in the equation shown in the block 483 denotes a centrifugal force or a Coriolis force. The "D-term" in the equation shown in the block 483 denotes a frictional force. The "G-term" in the equation shown in the block 483 denotes a gravity load. The inventors et al. constructed the control model with taking into account only the "G-term" and ignoring the "J-term", "C-term" and "D-term". Therefore, the blocks 482, 483 cooperatively perform computational processes in correspondence to those of the load calculation block 481 described with reference to FIG. 12 to output the disturbance load $\tau_g$.

The control section includes a differentiation block 411C. The differentiation block 411C performs discrete differential processes to output an angular velocity $\omega_M$ of the motor 200

(c.f. FIG. 1). The differentiation block 411C corresponds to the differentiation block 411 described with reference to FIG. 12, The control section includes an observer 421C. Like the third embodiment, the disturbance load $\tau_g$ and the angular velocity $\omega_M$ of the motor 200 are input to the observer 421C. State equation of the observer 421 is expressed by the following "Equation 22", $$\dot{x}_0 = \hat{A}x_0 + \hat{B}u_0$$
$$y_0 = x_0$$
[Equation 22]

$$\hat{A} = \begin{bmatrix} -\frac{D_M}{J_M} - g_1 & -\frac{K_s}{J_M R_g} & 0 & 0 & 0 & \frac{K_s}{J_M R_g} & 0 & 0 \\ \frac{1}{R_g} - g_2 & 0 & -1 & 0 & 0 & 0 & 0 & 0 \\ -g_3 & \frac{K_s}{J_L} & -\frac{D_L}{J_L} & \frac{D_L}{J_L} & -1 & -\frac{K_s}{J_L} & 0 & -\frac{1}{J_L} \\ -g_4 & 0 & 0 & 0 & 1 & 0 & 0 & 0 \\ -g_5 & 0 & 0 & -\omega_{d1}^2 & 0 & 0 & 0 & 0 \\ -g_6 & 0 & 0 & 0 & 0 & 0 & 1 & 0 \\ -g_7 & 0 & 0 & 0 & 0 & -\omega_{d6}^2 & 0 & 0 \\ -g_8 & 0 & 0 & 0 & 0 & 0 & 0 & 0 \end{bmatrix}$$

$$\hat{B} = \begin{bmatrix} \frac{K_t}{J_M} & 0 & g_1 \\ 0 & 0 & g_2 \\ 0 & -\frac{1}{J_L} & g_3 \\ 0 & 0 & g_4 \\ 0 & 0 & g_5 \\ 0 & 0 & g_6 \\ 0 & 0 & g_7 \\ 0 & 0 & g_8 \end{bmatrix},$$

$$x_0 = \begin{bmatrix} \hat{\omega}_M \\ \hat{\theta}_s \\ \hat{\omega}_L \\ \hat{\omega}_{va} \\ \dot{\hat{\omega}}_{va} \\ \hat{\theta}_{err} \\ \dot{\hat{\theta}}_{err} \\ \hat{\tau}_{dis} \end{bmatrix},$$

$$u_0 = \begin{bmatrix} I_{cmd} \\ \tau_g \\ \omega_M \end{bmatrix}$$

$\omega_{d6}$ in the aforementioned matrix equation means the angular frequency $\omega_d$ of an angular transmission error resulting from elastic deformation happening to the oscillatory cyclo-speed reducer 500A (c.f. Equation 4: k=6).

Like the third embodiment, the observer 421C may generate data indicating estimated values of state quantities such as the axial torsional vibration $\theta_s$ (c.f. the aforementioned "Equation 1"), the angular velocity $\omega_M$ of the motor 200, the angular velocity $\omega_L$ of the oscillatory cyclo-speed reducer 500 and the vibration component $\theta_{err}$. Unlike the third embodiment, the speed reducer system 100C controls the oscillatory cyclo-speed reducer 500A without the data indicating the axial torsional vibration $\theta_s$ (c.f. the above "Equation 1"), the angular velocity $\omega_M$ of the motor 200 (c.f. FIG. 1) and the angular velocity $\omega_L$ of the oscillatory cyclo-speed reducer 500.

The control section includes a torque calculation block 435C. On the other hand, the data, which indicates the estimated value of the vibration component $\theta_{err}$, is output from the observer 421C to the torque calculation block 435C like the third embodiment. The symbol "$K_{sn}$" put in the torque calculation block 435C means that the torque calculation block 435C is a transmission function which uses a nominal value of spring characteristics of the oscillatory cyclo-speed reducer 500A. The nominal value is obtained by a predetermined identification test. The torque calculation block 435C corresponds to the torque calculation block 435A described with reference to FIG. 12. Like the third embodiment, the torque calculation block 435C generates torque vibration data indicating an estimated value of the torque vibration $\tau_s$ from the data indicating the estimated value of the vibration component $\theta_{err}$.

The observer 421C may use the state equation expressed in the aforementioned "Equation 22" to generate data indicating an estimated value of the angular frequency $\omega_{va}$ and data indicating a derivative value of the angular frequency $\omega_{va}$. The control section includes blocks 491, 492. The symbol "$D_{Ln}$" shown in the block 491 means that the block 491 is a transmission function which uses a nominal value of a viscosity friction coefficient of the load shaft. The symbol "$J_{Ln}$" shown in the block 492 means that the block 492 is a transmission function which uses a nominal value of a moment of inertia on the load shaft. These nominal values are obtained by predetermined identification tests. The speed reducer system 100C adds output values of these blocks 491, 492 (c.f. the following "Equation 23") to calculate an estimated value of the torque vibration $\tau_{va}$ varying at the angular frequency $\omega_{va}$.

$$\hat{\tau}_{va} = J_{Ln}\dot{\hat{\omega}}_{va} + D_{Ln}\hat{\omega}_{va}$$
[Equation 23]

The control section includes dynamic compensators 493, 494. The torque vibration data indicating the estimated value of the torque vibration $\tau_s$ is output from the torque calculation block 435C to the dynamic compensator 493. The dynamic compensator 493 calculates the compensation current value $I_{cmp}$ to reduce the torque vibration $\tau_s$ and generates current data. The dynamic compensator 493 corresponds to the dynamic compensator 436 described with reference to FIG. 12.

The dynamic compensator 494 receives the data indicating the estimated value of the torque vibration $\tau_{va}$ obtained from the aforementioned "Equation 23". The dynamic compensator 494 calculates the compensation current value $I_{cmp}$ to reduce the torque vibration $\tau_{va}$, and generates current data.

The symbol "Z" shown in blocks of the dynamic compensators 493, 494 is a delay operator. The following "Equation 24" represents a transmission function of the dynamic compensators 493, 494.

$$T_m(s) = \frac{b_2 s^2 + b_1 s + b_0}{a_1}$$
[Equation 24]

-continued $$b_2 = R_g^2 J_M$$
$$b_1 = R_g^2 D_M$$
$$b_0 = K_s$$
$$a_0 = R_g K_t K_s$$

The control section includes BPF blocks 495, 496. The BPF block 495 extracts a frequency component from the current data, the frequency component varying at the angular frequency $\omega_{d6}$ of the angular transmission error. The transmission function of the BPF block 495 corresponds to the aforementioned "Equation 16" in which the angular frequency $\omega_{d6}$ is substituted for "$\omega$". The BPF block 496 extracts a frequency component from the current data, the frequency component varying at the angular frequency $\omega_{d1}$ of the angular transmission error. The transmission function of the BPF block 496 corresponds to the aforementioned "Equation 16" in which the angular frequency $\omega_{d1}$ is substituted for "$\omega$".

The symbols "$SW_1$", "$SW_6$" in the control section mean switches which are incorporated in the control section by the inventors et al. The symbol "$I_q^{ref}$" in the control section means a target current value of the motor 200. If the inventors et al. turn on the switches $SW_1$, $SW_6$, the compensation current values $I_{cmp}$ of the frequency components extracted by the BPF blocks 495, 496 are added to the target current value $I_q^{ref}$. If the inventors et al. turn off the switch $SW_6$ whereas the inventors et al. turn on the switches $SW_1$, only the compensation current value $I_{cmp}$ of the frequency component extracted by the BPF block 496 is added to the target current value $I_q^{ref}$. On the other hand, if the inventors et al. turn on the switch $SW_6$ whereas the inventors et al. turn off the switches $SW_1$, only the compensation current value $I_{cmp}$ of the frequency component extracted by the BPF block 495 is added to the target current value $I_q^{ref}$. The command current value $I_{cmd}$ is determined by one of these addition processes.

The control section includes a ZOH (Zero-Order Hold) block 497. The ZOH block 497 is incorporated to hold a current value during the sampling of the rotational angle of the motor 200. Although the ZOH block 497 is not shown in the control sections described in the context of the first to third embodiments, the control sections of the first to third embodiments also perform processes similar to those of the ZOH block 497 since they also process discrete data.

Figure 18A:
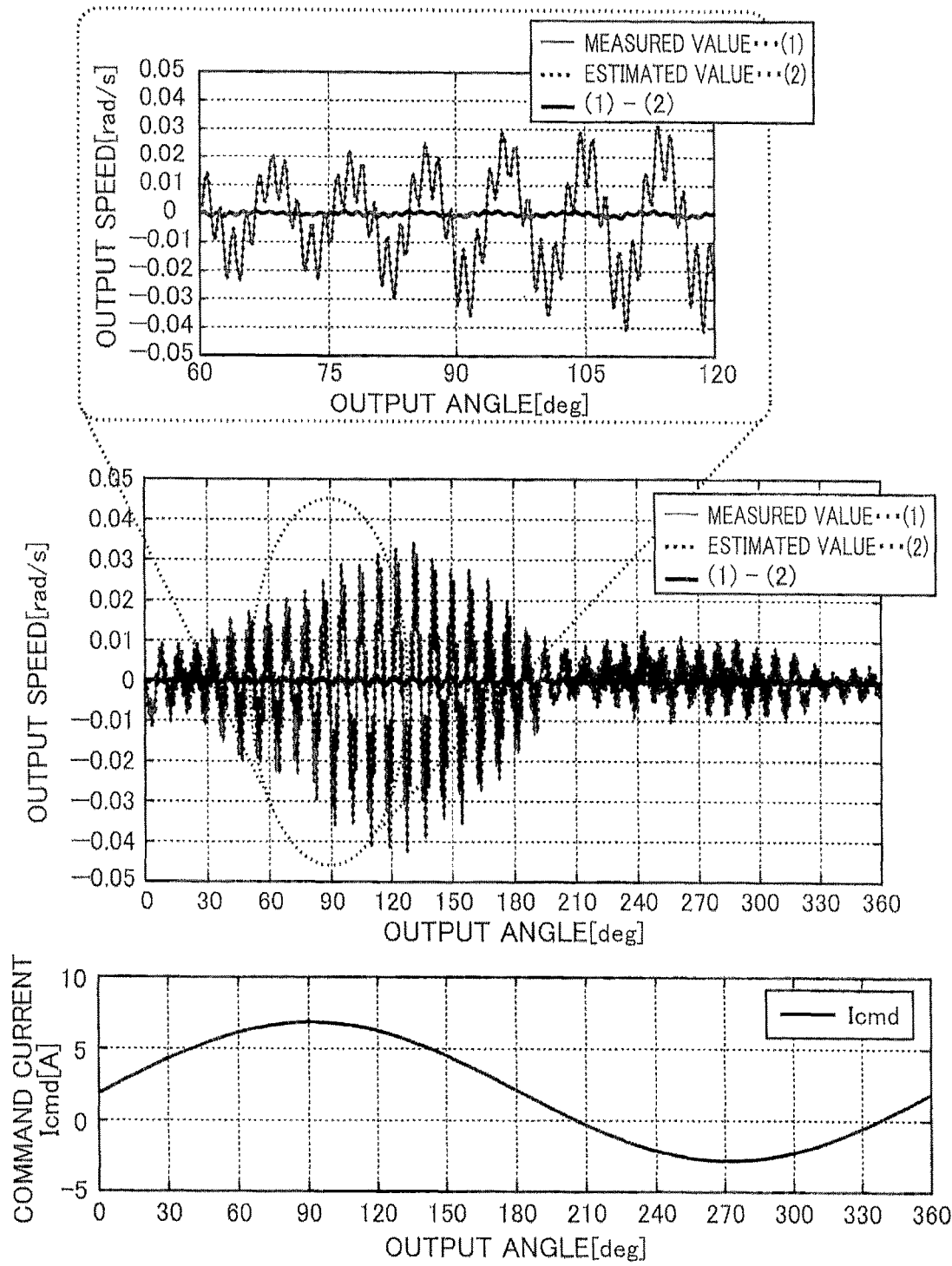
FIG. 18A is graphs showing an output speed of an oscillatory cyclo-speed reducer and a command current, which is input to a motor for driving the oscillatory cyclo-speed reducer.

FIGS. 18A to 18D are graphs showing an output speed of the oscillatory cyclo-speed reducer 500A and a command current which is input to the motor 200 (c.f. FIG. 1) for driving the oscillatory cyclo-speed reducer 500A. The graphs shown in FIGS. 18A to 18D are obtained under control of the control section described with reference to FIG. 17. A verification test of the control section carried out by the inventors et al. is described with reference to FIGS. 17 to 18D, As shown in FIG. 18A, when the switches $SW_1$, $SW_6$ are both turned off, the command current value $I_{cmd}$ shows a smooth sine wave whereas the output speed shows a waveform in which a wave curve varying at large amplitude and at long periods and a wave curve varying at small amplitude and at short period are superimposed.

Figure 18B:
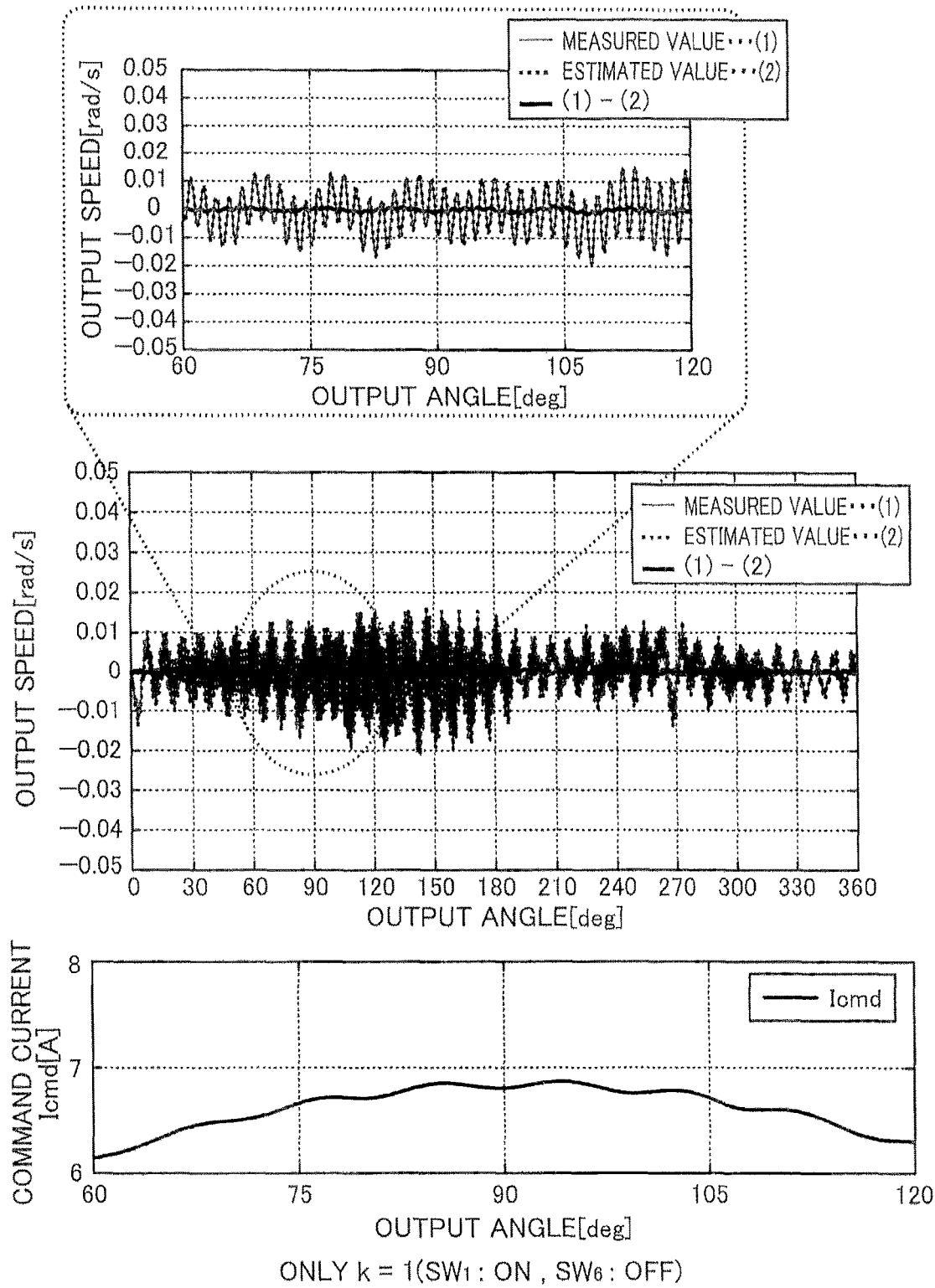
FIG. 18B is graphs showing an output speed of the oscillatory cyclo-speed reducer and a command current, which is input to the motor for driving the oscillatory cyclo-speed reducer.
Figure 18C:
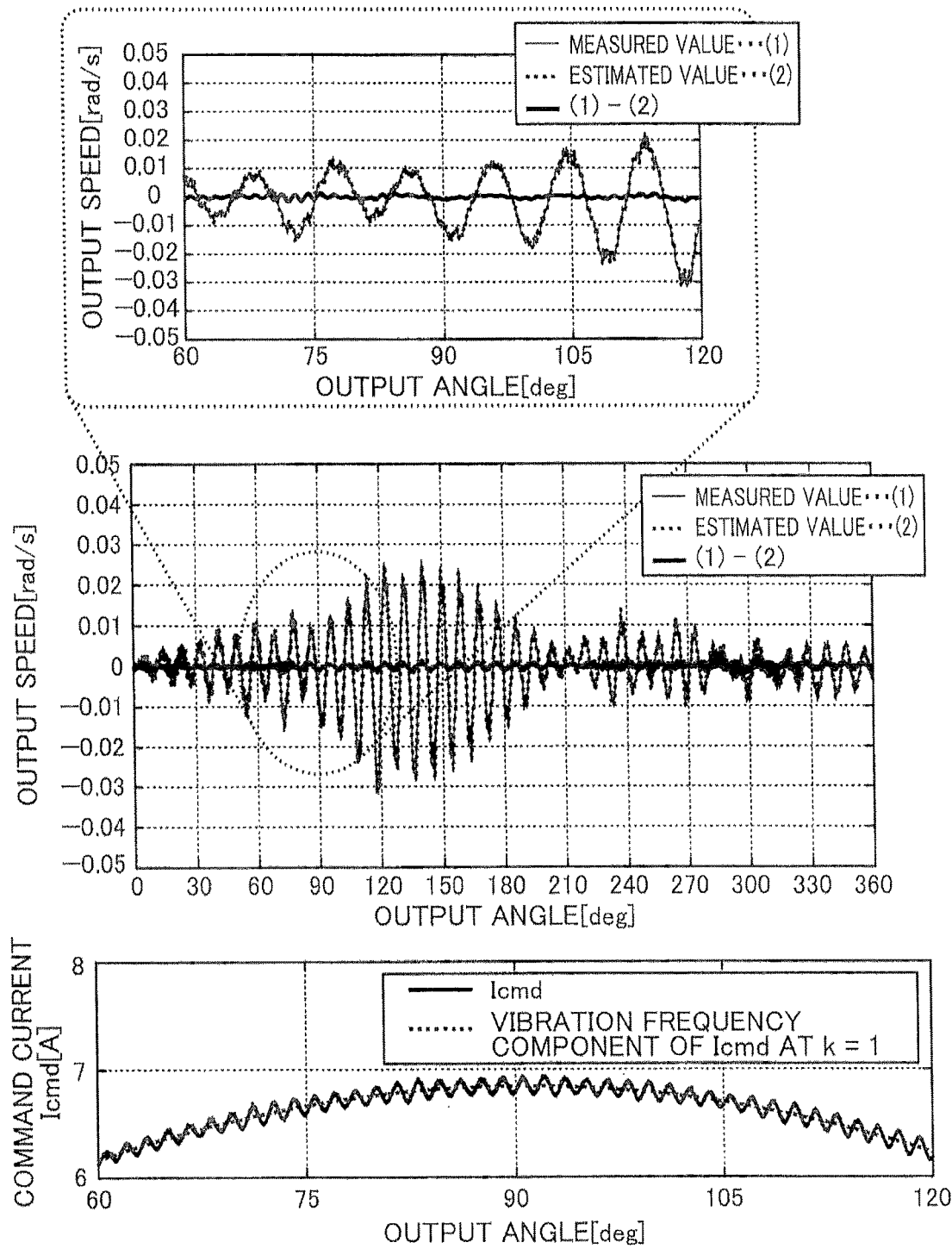
FIG. 18C is graphs showing an output speed of the oscillatory cyclo-speed reducer and a command current, which is input to the motor for driving the oscillatory cyclo-speed reducer.

As shown in FIG. 18B, when only the switch $SW_1$ is turned on, the output speed shows a waveform varying at small amplitude and at short period. As shown in FIG. 18C, when only the switch $SW_6$ is turned on, the output speed shows a waveform varying at large amplitude and at long period.

Figure 18D:
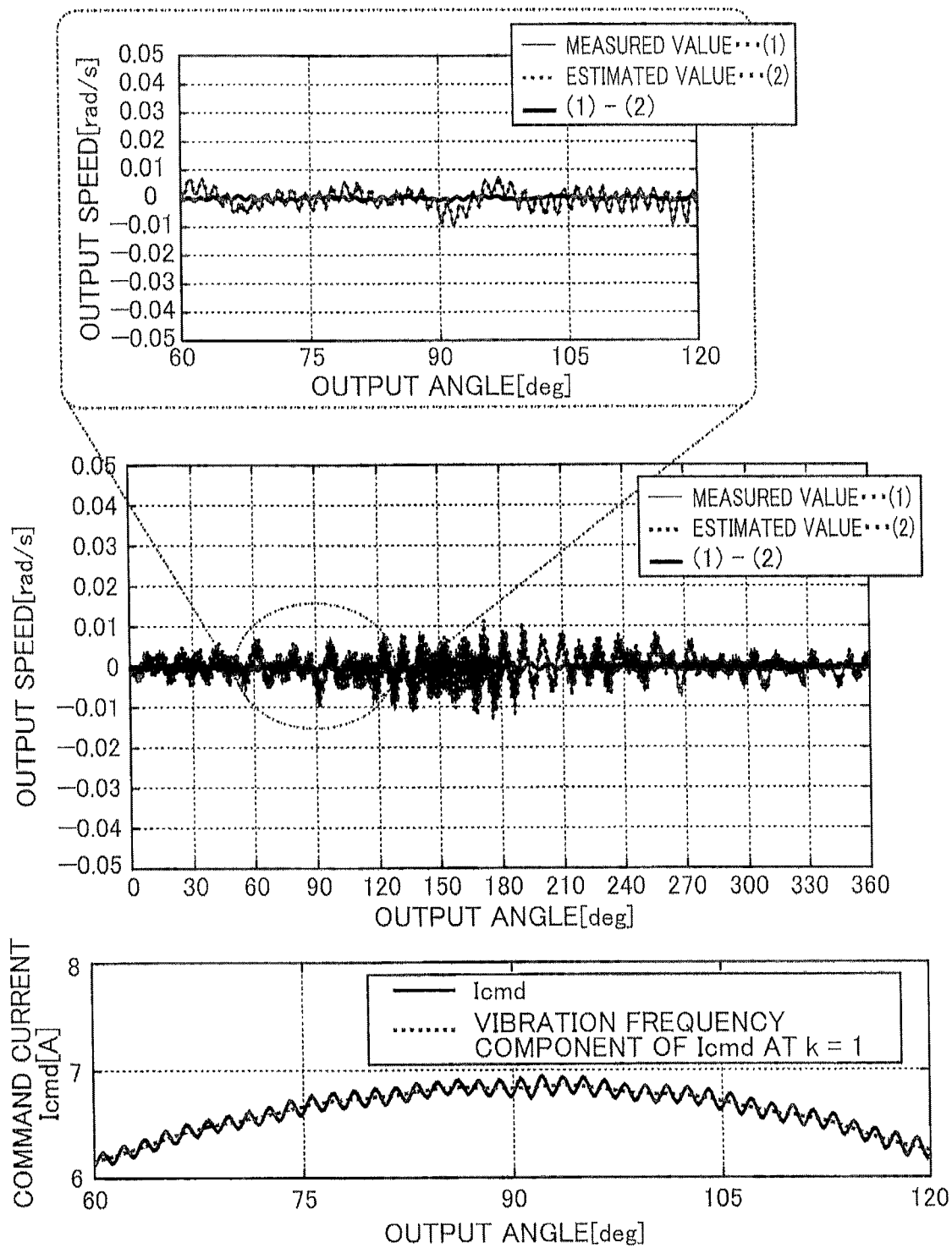
FIG. 18D is graphs showing an output speed of the oscillatory cyclo-speed reducer and a command current, which is input to the motor for driving the oscillatory cyclo-speed reducer.

As shown in FIG. 18D, when the switches $SW_1$, $SW_6$ are both turned on, the output speed shows a waveform having the smallest vibration amplitude.

Figure 19A:
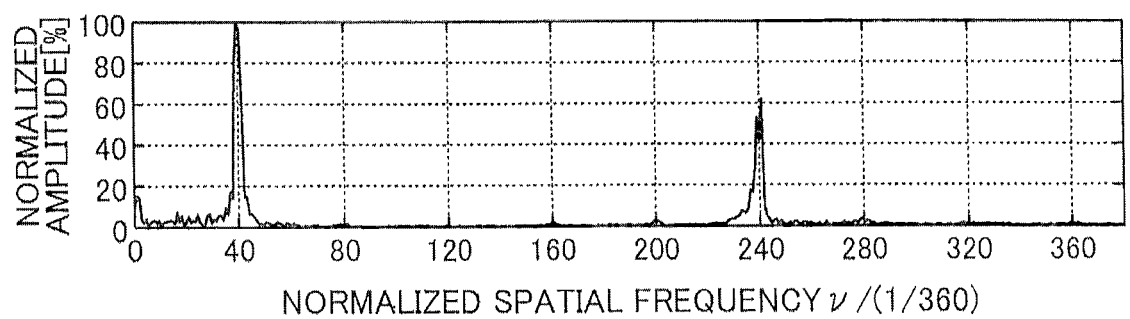
FIG. 19A is a graph showing a spatial frequency spectrum obtained from a spatial FFT analysis for data about the output speed shown in FIG. 18A.
Figure 19B:
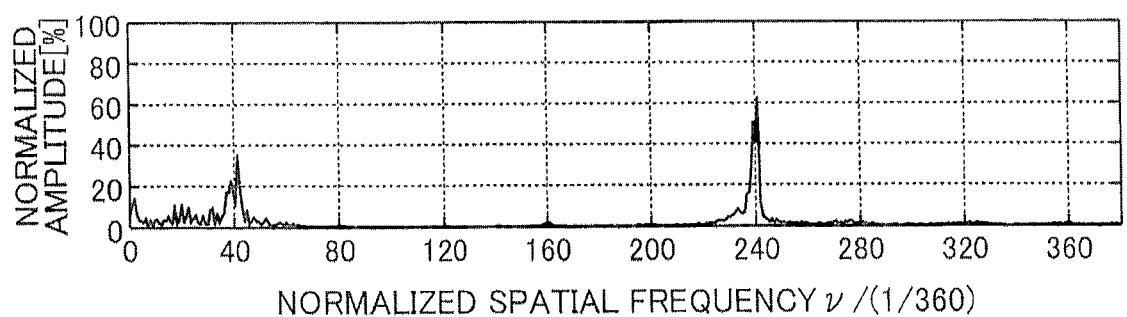
FIG. 19B is a graph showing a spatial frequency spectrum obtained from a spatial FFT analysis for data about the output speed shown in FIG. 18B.
Figure 19C:
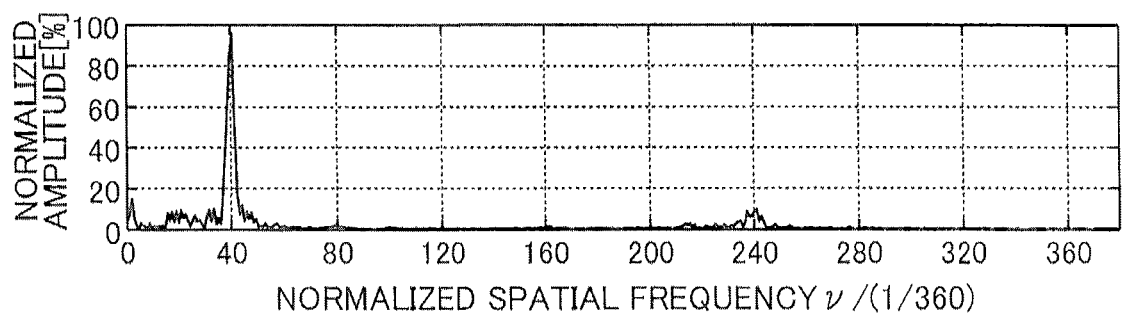
FIG. 19C is a graph showing a spatial frequency spectrum obtained from a spatial FFT analysis for data about the output speed shown in FIG. 18C.
Figure 19D:
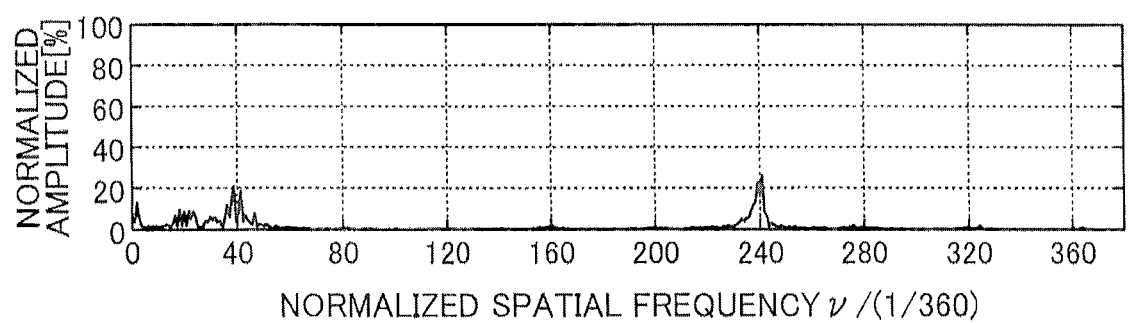
FIG. 19D is a graph showing a spatial frequency spectrum obtained from a spatial FFT analysis for data about the output speed shown in FIG. 18D.

The inventors et al. carried out spatial FFT analyses for data about the output speed shown in FIGS. 18A to 18D. FIG. 19A is a graph showing a spatial frequency spectrum obtained from the spatial FFT analysis for the data of the output speed shown in FIG. 18A. FIG. 19B is a graph showing a spatial frequency spectrum obtained from the spatial FFT analysis for the data of the output speed shown in FIG. 18B. FIG. 19C is a graph showing a spatial frequency spectrum obtained from the spatial FFT analysis for the data of the output speed shown in FIG. 18C. FIG. 19D is a graph showing a spatial frequency spectrum obtained from the spatial FFT analysis for the data of the output speed shown in FIG. 18D, As shown in FIG. 19A, when the switches $SW_1$, $SW_6$ are both turned off, a frequency component in correspondence to the number of the internal-tooth pins (40) and a frequency component in correspondence to a product (240) of the number of the internal-tooth pins and the number of the holes of the gear portion show high values.

As shown in FIG. 19B, when only the switch $SW_1$ is turned on, the frequency component in correspondence to the product (240) of the number of the internal-tooth pins and the number of the holes of the gear portion is maintained substantially at the same level as the spectrum shown in FIG. 19A whereas the frequency component in correspondence to the number of the internal-tooth pins (40) is largely reduced.

As shown in FIG. 19C, when only the switch $SW_6$ is turned on, the frequency component in correspondence to the number of the internal-tooth pins (40) is maintained substantially at the same level as the spectrum shown in FIG. 19A whereas the frequency component in correspondence to the product (240) of the number of the internal-tooth pins and the number of the holes of the gear portion is largely reduced.

As shown in FIG. 19D, when the switches $SW_1$, $SW_6$ are both turned on, the frequency component in correspondence to the number of the internal-tooth pins (40) and the frequency component corresponding to the product (240) of the number of the internal-tooth pins and the number of the holes of the gear portion are both suppressed to very low levels as compared with the spectrum shown in FIG. 19A.

Table 2 shows peak values of the vibration. As shown in Table 2, the inventors et al, confirmed that the speed reducer system 100C (c.f. FIG. 17) had achieved a vibration suppression by 70.6%.

TABLE 2

| Experiment Condition | | |
| --- | --- | --- |
| $SW_1$ | $SW_6$ | Peak Value [rad/s] |
| OFF | OFF | 0.0766 |
| ON | OFF | 0.0377 (−50.8%) |
| OFF | ON | 0.0582 (−24.0%) |
| ON | ON | 0.0225 (−70.6%) |

The principles of the aforementioned various embodiments may be combined to meet requests for control of a speed reducer.

The control devices and the speed reducer systems described in the context of the aforementioned embodiments mainly include the following features.

A control device according to one aspect of the aforementioned embodiments controls a motor configured to drive an oscillatory cyclo-speed reducer including an oscillatory gear portion which is provided with at least one hole at an eccentric position. The control device includes an angle acquirer configured to acquire input information about an input rotational angle, which indicates a rotational angle of the motor, an estimator configured to estimate an angular error between the input rotational angle and an output rotational angle indicating a rotational angle of the oscillatory cyclo-speed reducer on the basis of a hole number, which indicates a quantity of the at least one hole, and a corrector, which determines a compensation current value in correspondence to the angular error. The corrector uses the compensation current value to correct a command current value and set a magnitude of a current, which is supplied to the motor.

With regard to the aforementioned configuration, since the oscillatory gear portion is provided with at least one hole at an eccentric position, a rigidity variation occurs in association with a motion of the oscillatory gear portion. The rigidity variation causes an axial torsional vibration. Consequently, an angular transmission error happens to the oscillatory cyclo-speed reducer. Therefore, a quantity of the hole(s) formed in the oscillatory gear portion acts as a factor of the angular transmission error.

The estimator may estimate an angular error on the basis of a quantity of the hole(s) formed in the oscillatory gear portion, the angular error being caused by the rigidity variation resultant from the hole(s) of the oscillatory gear portion. Since the angular error is estimated without data inherent in every oscillatory cyclo-speed reducer, the control device may be easily utilized for various oscillatory cyclo-speed reducers. Since the corrector uses the compensation current value determined in correspondence to the estimated angular error to correct a command current value, there is a sufficient reduction in angular transmission error of the oscillatory cyclo-speed reducer.

In the aforementioned configuration, the angular error may be an axial torsional vibration.

With regard to the aforementioned configuration, since the estimator estimates an axial torsional vibration on the basis of a quantity of the hole(s) formed in the oscillatory gear portion, the control device may sufficiently reduce the angular transmission error of the oscillatory cyclo-speed reducer without data inherent in every oscillatory cyclo-speed reducer.

In the aforementioned configuration, the angular error may be a vibration component caused by the at least one hole.

With regard to the aforementioned configuration, since the estimator estimates a vibration component caused by the at least one hole on the basis of the hole(s) formed in the oscillatory gear portion, the control device may sufficiently reduce the angular transmission error of the oscillatory cyclo-speed reducer without data inherent in every oscillatory cyclo-speed reducer.

In the aforementioned configuration, the estimator includes a state observer which uses the input information and the magnitude of the current supplied to the motor as inputs to estimate the angular error.

With regard to the aforementioned configuration, the state observer may receive the input information about the input rotational angle, which indicates the rotational angle of the motor, and the magnitude of the current, which is supplied to the motor, as the inputs to estimate the angular error. Since the control device may reduce the angular transmission error of the oscillatory cyclo-speed reducer without information from an output side of the oscillatory cyclo-speed reducer, a designer using the control device to design a machine device may simplify facilities for acquiring information necessary for the control. Even under a condition in which an arrangement of information acquiring facilities is difficult on an output side of the oscillatory cyclo-speed reducer, the designer may use the control device to reduce the angular transmission error of the oscillatory cyclo-speed reducer.

In the aforementioned configuration, the state observer may use a periodically varying disturbance factor as an input to estimate the angular error.

With regard to the aforementioned configuration, since the state observer uses the periodically varying disturbance factor as the input to estimate the angular error, the control device may sufficiently reduce the angular transmission error of the oscillatory cyclo-speed reducer even when the oscillatory cyclo-speed reducer is used under the presence of the periodically varying disturbance factor.

In the aforementioned configuration, the oscillatory cyclo-speed reducer may include $N_p$ internal teeth which are meshed with the oscillatory gear portion to decelerate an angular velocity $\omega_M$ of the motor. The hole number may be expressed by a natural number k. The estimator may calculate an angular frequency $\omega_d$ of an angular transmission error resulting from elastic deformation of a member inside the oscillatory cyclo-speed reducer from Equation 25. The estimator may use a discrete-time state-space model including the angular frequency $\omega_d$ as a matrix component to estimate the angular error.

$$\omega_d = \frac{kN_p\omega_M}{R_g} \quad \text{[Equation 25]}$$

With regard to the aforementioned configuration, since the estimator uses the discrete-time state-space model including the angular frequency $\omega_d$ as a matrix component to estimate the angular error, the estimator may appropriately estimate the angular error in light of the angular transmission error caused by elastic deformation inside the oscillatory cyclo-speed reducer.

In the aforementioned configuration, the oscillatory gear portion may include $N_g$ oscillation gears. Each of the $N_g$ oscillation gears may be formed with $k_e$ holes. The natural number k may be calculated from "Equation 26".

$$k=N_g \times k_e \quad \text{[Equation 26]}$$

With regard to the aforementioned configuration, the control device may be suitably utilized to control a motor which drives an oscillatory cyclo-speed reducer including one or more oscillation gears. Therefore, the control device may be utilized to control the motor which is used together with a variety of oscillatory cyclo-speed reducers.

In the aforementioned configuration, the estimator may calculate an angular frequency $\omega_{d1}$ of an angular transmission error resulting from a manufacturing error of the oscillatory cyclo-speed reducer from Equation 27. The estimator may use a discrete-time state-space model including the angular frequency $\omega_{d1}$ as a matrix component to estimate the angular error.

$$\omega_{d1} = \frac{N_p \omega_M}{R_g} \quad \text{[Equation 27]}$$

With regard to the aforementioned configuration, since the estimator uses the discrete-time state-space model including the angular frequency $\omega_{d1}$ as a matrix component in order to estimate the angular error, the estimator may appropriately estimate the angular error in light of the angular transmission error caused by a manufacturing error of the oscillatory cyclo-speed reducer.

In the aforementioned configuration, the corrector may include a torque calculator, which calculates a torque vibration vibrating at the angular frequency $\omega_d$ from the angular error estimated by the estimator and spring characteristics of the oscillatory cyclo-speed reducer, and a current calculator which calculates the compensation current value to reduce the torque vibration.

With regard to the aforementioned configuration, since the current calculator calculates the compensation current value to reduce the torque vibration, which is calculated by the torque calculator, there is a sufficient reduction in angular transmission error of the oscillatory cyclo-speed reducer.

In the aforementioned configuration, the torque calculator may extract a frequency component varying at the angular frequency $\omega_d$ from data about the angular error estimated by the estimator. The torque calculator may use the extracted frequency component to calculate the torque vibration.

With regard to the aforementioned configuration, since the torque calculator extracts the frequency component varying at the angular frequency $\omega_d$ from the data about the angular error estimated by the estimator and uses the extracted frequency component to calculate the torque vibration, there is a reduction in noise contained in data about the calculated torque vibration. Therefore, the control device may accurately control the motor.

In the aforementioned configuration, the current calculator may generate current data indicating a magnitude of a compensation current from the torque vibration. The current calculator may extract a frequency component varying at the angular frequency $\omega_d$ from the current data to determine the compensation current value.

With regard to the aforementioned configuration, since the current calculator generates the current data indicating the magnitude of the compensation current from the torque vibration and extracts the frequency component varying at the angular frequency $\omega_d$ from the current data to determine the compensation current value, there is a reduction in noise contained in the compensation current value. Therefore, the control device may accurately control the motor.

A speed reducer system according to another aspect of the aforementioned embodiments includes an oscillatory cyclo-speed reducer including an oscillatory gear portion, which is provided with at least one hole at an eccentric position, a motor, which drives the oscillatory cyclo-speed reducer, and a control device, which controls the motor. The control device includes an angle acquirer, which acquires input information about an input rotational angle indicating a rotational angle of the motor, an estimator, which estimates an angular error between the input rotational angle and an output rotational angle indicating a rotational angle of the oscillatory cyclo-speed reducer on the basis a hole number indicating a quantity of the at least one hole, and a corrector, which determines a compensation current value in correspondence to the angular error. The corrector uses the compensation current value to correct a command current value and set a magnitude of a current, which is supplied to the motor.

With regard to the aforementioned configuration, the estimator may estimate an angular error caused by a rigidity variation resultant from the hole(s) of the oscillatory gear portion on the basis of a quantity of the hole(s) formed in the oscillatory gear portion. Since the angular error is estimated without data inherent in every oscillatory cyclo-speed reducer, the control device may be easily utilized in various oscillatory cyclo-speed reducers. Since the corrector uses the compensation current value determined in correspondence to the estimated angular error to correct the command current value, the angular transmission error of the oscillatory cyclo-speed reducer is sufficiently reduced.

The principles of the aforementioned embodiments are suitably utilized for devices which use oscillatory cyclo-speed reducers.

This application is based on Japanese Patent application No. 2014-180453 filed in Japan Patent Office on Sep. 4, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A control device for controlling a motor configured to drive an oscillatory cyclo-speed reducer including an oscillatory gear portion which is provided with at least one hole at an eccentric position, the control device comprising:
   an angle acquirer configured to acquire input information about an input rotational angle which indicates a rotational angle of the motor;
   an estimator configured to estimate an angular error between the input rotational angle and an output rotational angle indicating a rotational angle of the oscillatory cyclo-speed reducer, the angular error being caused by a rigidity variation of the oscillatory gear portion resultant from a position of the at least one hole of the oscillatory gear portion, based on a hole number which indicates a quantity of the at least one hole, a number of internal teeth meshed with the oscillatory gear portion, a speed reduction ratio of the oscillatory cyclo-speed reducer, and an angular velocity of the motor; and
   a corrector configured to determine a compensation current value in correspondence to the angular error, the corrector using the compensation current value to correct a command current value and set a magnitude of a current, which is supplied to the motor.

2. The control device according to claim 1, wherein the angular error is an axial torsional vibration.

3. The control device according to claim 1, wherein the angular error is a vibration component caused by the at least one hole.

4. The control device according to claim 1, wherein the estimator includes a state observer which uses the input information and the magnitude of the current supplied to the motor as inputs to estimate the angular error.

5. The control device according to claim 4, wherein the state observer uses a periodically varying disturbance factor as an input to estimate the angular error.

6. A control device for controlling a motor configured to drive an oscillatory cyclo-speed reducer including an oscillatory gear portion which is provided with at least one hole at an eccentric position, the control device comprising:
an angle acquirer configured to acquire input information about an input rotational angle which indicates a rotational angle of the motor;
an estimator configured to estimate an angular error between the input rotational angle and an output rotational angle indicating a rotational angle of the oscillatory cyclo-speed reducer based on a hole number which indicates a quantity of the at least one hole; and
a corrector configured to determine a compensation current value in correspondence to the angular error, the corrector using the compensation current value to correct a command current value and set a magnitude of a current, which is supplied to the motor,
wherein the oscillatory cyclo-speed reducer includes $N_p$ internal teeth which are meshed with the oscillatory gear portion and decelerates an angular velocity $\omega_M$ of the motor by using a reduction ratio $R_g$ of the oscillatory cyclo-speed reducer;
wherein the hole number is expressed by a natural number k; and
wherein the estimator calculates an angular frequency $\omega_d$ of an angular transmission error resulting from elastic deformation inside the oscillatory cyclo-speed reducer from Equation 1, the estimator using a discrete-time state-space model, which includes the angular frequency $\omega_d$ as a matrix component, to estimate the angular error:

$$\omega_d = \frac{kN_p\omega_M}{R_g}. \quad \text{[Equation 1]}$$

7. The control device according to claim 6, wherein the oscillatory gear portion includes $N_g$ oscillation gears; wherein each of the $N_g$ oscillation gears is provided with $k_e$ holes; and wherein the natural number k is calculated from "Equation 2":

$$k=N_g \times k_e. \quad \text{[Equation 2]}$$

8. The control device according to claim 6, wherein the estimator calculates an angular frequency $\omega_{d1}$ of an angular transmission error resulting from a manufacturing error of the oscillatory cyclo-speed reducer from Equation 3, the estimator using a discrete-time state-space model including the angular frequency $\omega_{d1}$ as a matrix component to estimate the angular error:

$$\omega_{d1} = \frac{N_p\omega_M}{R_g}. \quad \text{[Equation 3]}$$

9. The control device according to claim 6, wherein the corrector includes a torque calculator configured to calculate a torque vibration, which vibrates at the angular frequency $\omega_d$, from the angular error estimated by the estimator and spring characteristics of the oscillatory cyclo-speed reducer, and a current calculator configured to calculate the compensation current value to reduce the torque vibration.

10. The control device according to claim 9, wherein the torque calculator extracts a frequency component varying at the angular frequency $\omega_d$ from data about the angular error estimated by the estimator, the torque calculator using the extracted frequency component to calculate the torque vibration.

11. The control device according to claim 9, wherein the current calculator generates current data indicating a magnitude of a compensation current from the torque vibration, the current calculator extracting a frequency component varying at the angular frequency $\omega_d$ from the current data to determine the compensation current value.

12. A speed reducer system, comprising:
an oscillatory cyclo-speed reducer including an oscillatory gear portion which is provided with at least one hole at an eccentric position;
a motor configured to drive the oscillatory cyclo-speed reducer; and
a control device configured to control the motor,
wherein the control device includes an angle acquirer, which acquires input information about an input rotational angle indicating a rotational angle of the motor, an estimator, which estimates an angular error between the input rotational angle and an output rotational angle, which indicates a rotational angle of the oscillatory cyclo-speed reducer based on a hole number indicating a quantity of the at least one hole, and a corrector, which determines a compensation current value in correspondence to the angular error, the corrector using the compensation current value to correct a command current value and set a magnitude of a current, which is supplied to the motor,
wherein the oscillatory cyclo-speed reducer includes $N_P$ Internal teeth which are meshed with the oscillatory gear portion and decelerates an angular velocity $CO_M$ of the motor by using a reduction ratio $R_g$ of the oscillatory cyclo-speed reducer;
wherein the hole number is expressed by a natural number k; and
wherein the estimator calculates an angular frequency $\omega_d$ of an angular transmission error resulting from elastic deformation inside the oscillatory cyclo-speed reducer from Equation 1, the estimator using a discrete-time state-space model, which includes the angular frequency $\omega_d$ as a matrix component, to estimate the angular error:

$$\omega_d = \frac{kN_p\omega_M}{R_g}. \quad \text{[Equation 1]}$$

* * * * *